US007653516B2

(12) United States Patent
Babu et al.

(10) Patent No.: US 7,653,516 B2
(45) Date of Patent: Jan. 26, 2010

(54) SYSTEM AND METHOD OF ESTABLISHING A RELIABILITY CHARACTERISTIC

(75) Inventors: Prakash B. Babu, Peoria, IL (US); Doyle G. Heyveld, Peoria, IL (US); Robert H. Yonker, Metamora, IL (US)

(73) Assignee: Caterpillar Inc., Peoria, IL (US)

(*) Notice: Subject to any disclaimer, the term of this patent is extended or adjusted under 35 U.S.C. 154(b) by 1523 days.

(21) Appl. No.: 10/327,547

(22) Filed: Dec. 20, 2002

(65) Prior Publication Data

US 2004/0172573 A1 Sep. 2, 2004

(51) Int. Cl.
*G06F 17/50* (2006.01)

(52) U.S. Cl. ........ 703/1; 714/1

(58) Field of Classification Search ........ 703/1, 703/2, 6; 714/37, 38, 1, 20; 700/83; 702/182, 702/81, 183; 705/28, 26; 709/223
See application file for complete search history.

(56) References Cited

U.S. PATENT DOCUMENTS

| | | | | |
|---|---|---|---|---|
| 6,557,120 | B1 * | 4/2003 | Nicholson et al. | 714/38 |
| 6,675,129 | B1 * | 1/2004 | Cambon et al. | 702/182 |
| 2002/0055886 | A1 * | 5/2002 | Hinckley | 705/26 |
| 2002/0078403 | A1 * | 6/2002 | Gullo et al. | 714/37 |
| 2002/0128790 | A1 * | 9/2002 | Woodmansee | 702/81 |
| 2002/0151992 | A1 * | 10/2002 | Hoffberg et al. | 700/83 |
| 2003/0070114 | A1 * | 4/2003 | Yasuda | 714/20 |
| 2003/0097315 | A1 * | 5/2003 | Guerrero et al. | 705/28 |
| 2003/0105852 | A1 * | 6/2003 | Das et al. | 709/223 |
| 2003/0191699 | A1 * | 10/2003 | Deveault et al. | 705/28 |
| 2004/0117152 | A1 * | 6/2004 | Shafer et al. | 702/183 |
| 2004/0123179 | A1 * | 6/2004 | Dragomir-Daescu et al. | 714/1 |

* cited by examiner

*Primary Examiner*—Paul L Rodriguez
*Assistant Examiner*—Kandasamy Thangavelu
(74) *Attorney, Agent, or Firm*—W. Bryan McPherson; Finnegan, Henderson, Farabow, Garrett & Dunner

(57) ABSTRACT

The present invention includes a method and system configured to establish a reliability characteristic associated with a part type. The method includes the step of establishing a use associated with a part, the part being of the part type, establishing an amount of usage associated with the part, establishing a service characteristic associated with said part, and establishing the reliability characteristic associated with the part type in response to said part use the part usage, and the part service characteristic.

20 Claims, 46 Drawing Sheets

SYSTEM AND METHOD OF ESTABLISHING A RELIABILITY CHARACTERISTIC

TECHNICAL FIELD

This invention relates generally to a system and method of establishing a reliability characteristic and more particularly, to a system and method of establishing a reliability characteristic associated with a part.

BACKGROUND

Accurate reliability information associated with a part is desired in order to effectively manage the business aspects associated with the part. For example, a part with a low reliability may cause an excessive amount of warranty claims, which is undesirable. In addition, inaccurate reliability information may lead to disadvantageous service agreements based on the part. Currently, accurate reliability information is difficult and expensive to obtain. Current systems may address a narrow aspect of reliability. As such they each have a database of information, i.e., a piece of the puzzle. However, none of the existing systems combine the data in a manner that enables a thorough analysis of reliability characteristics. Generally the reliability data is limited, and difficult to analyze from multiple analysis perspectives.

The present invention is directed to overcoming one or more of the problems set forth above.

SUMMARY OF THE INVENTION

In one aspect of the present invention, a method of establishing a reliability characteristic associated with a part type is provided. The method includes the steps of, establishing a use associated with a part, the part being of the part type, establishing a service characteristic associated with the part, and establishing the reliability characteristic associated with the part type in response to the part use, and the part service characteristic.

In another aspect of the present invention, a computer system configured to establish a reliability characteristic associated with a part type is disclosed. The computer system includes a repository configured to store information associated with the part type, said information including a use of a part, the part being of the part type, and a service characteristic of the part; and a controller configured to establish the reliability characteristic associated with the part type in response to the part use, and the part service characteristic.

BRIEF DESCRIPTION OF THE DRAWINGS

FIGS. 6A, 6B, 6C, 6D, and 6E illustrate input screens associated with division topics.

DETAILED DESCRIPTION

The present invention includes a method and system configured to establish a reliability characteristic associated with a part type. In one embodiment, a part type is a type of part that may have multiple instantiations. For example, there may be many cars (parts) of a particular car model (part type). A part type may be an entity that may not be dissembled into other parts, e.g., a bolt. Alternatively, a part type may be an assembly comprised of multiple part types In addition, the part type may be a piece of equipment, such as an engine, mobile machine (e.g., automobile, construction equipment, airplane, boat etc.), appliance (e.g., refrigerator, freezer, microwave, television etc.) or other party type that is comprised of multiple part types.

Figure 1:
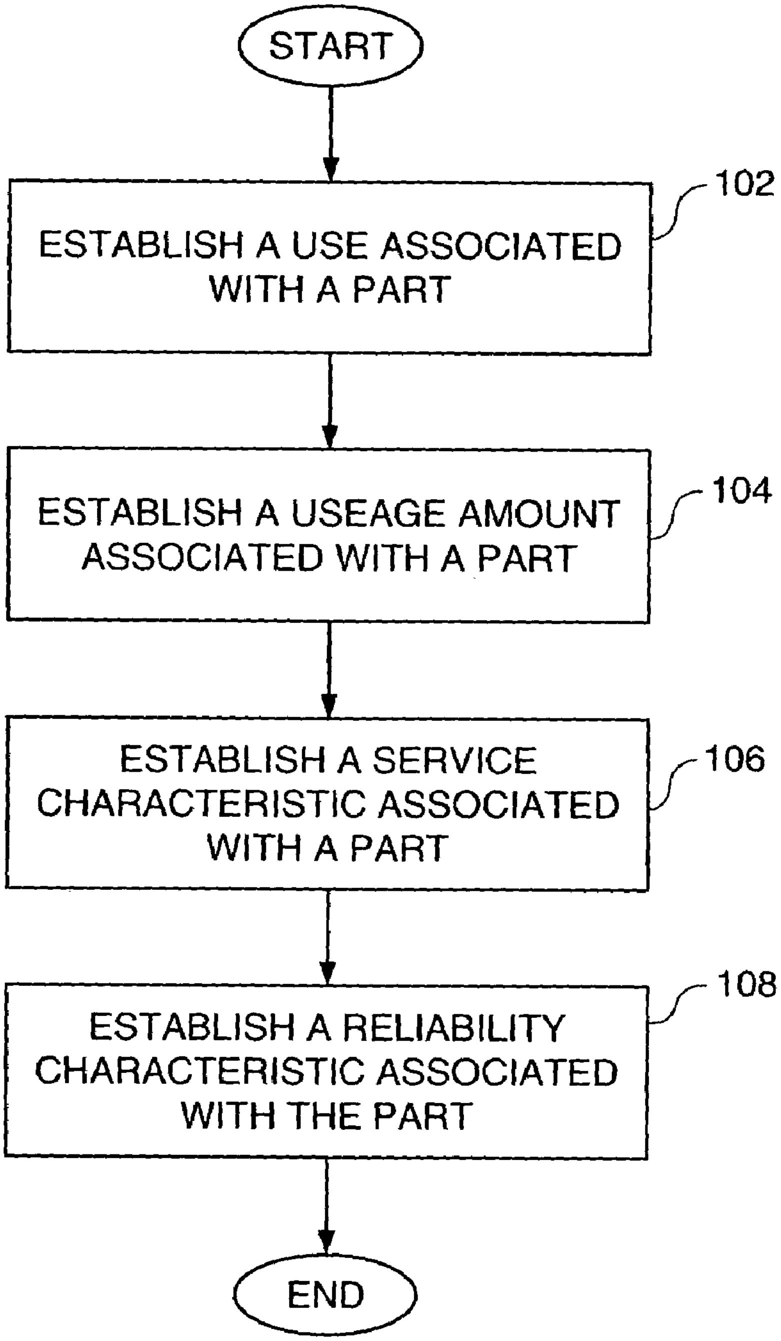
FIG. 1 illustrates on embodiment of a method of establishing a reliability characteristic.

FIG. 1 illustrates one embodiment of a method associated with the present invention. For the purposes of discussion, examples that are provided will be provided with reference to machines. However, as indicated, the invention is applicable to any part type. In a first control block 102, a use associated with a part (of type part type) is established. The use of a particular part of part type may be a general or specific identification of the environment, type of work, or type of use the part will be engaged in. For example, types of uses may include agriculture, building construction, building services, construction, equipment services, forestry, general industrial, heavy construction, logging, manufacturing, marine, material handling, mining, miscellaneous services, and/or petroleum.

As will be explained, the type of use the part is involved in may be taken into account when determining a reliability characteristic of the part, and/or of the part type in general. In one embodiment, the use of a part is determined from the owner of a part. For example, in one embodiment, when the part is sold there is a certain amount of sales related information that is collected about the part. For example, with machines such as work machines (e.g., earthmoving equipment, construction equipment etc.) the collected information may include who purchased the machine, how much the machine was purchased for, what is the intended use of the machine, is the machine for owners or to be leased, who was the dealer that sold the machine (if one is involved), and/or what location is the machine to be used in.

In a second control block 104, an amount of usage associated with the part is established. The amount of usage may be an actual amount of usage, an estimated amount of usage, and/or an estimated amount of usage that is based in part on previously monitored actual amount of usage. In one embodiment, an estimated amount of usage may be based on the use of the part. For example, monitoring of machines used in building construction may indicate that the machine is used 2000 hours a year. However, the same type of machines in a heavy construction environment (or use) may be determined to be used 3000 hours a year. In addition, the location of the use may be used to estimate the usage. For example, monitoring of machines used in Minnesota may indicate they are used 2000 hours a year, while the same type of machine may be used 3000 hours a year in Florida due to the fact that the weather may be more conducive to year round operations. In addition, usage estimations may be based on particular owners. For example, monitoring of usage may indicate that customer 1 operates their machine 2000 hours a year, while data may indicate that customer 2 uses the same type of machine 3000 hours a year. Therefore, in one embodiment, an estimation of machine usage may be based upon the type of use, location of the use, and/or the person/company using the machine.

In one embodiment, machine usage may be an actual amount of usage. For example, the hours of machine use (or mileage) may be recorded when the machine is being serviced. Therefore, the machine usage is based on the actual amount of usage which may be as recent as the last time the machine was serviced. Alternatively the actual usage may be determined on the machine, and relayed to a data facility on an established basis (e.g., periodically or random intervals). For example, the information may be relayed by a wireless communication network, such as a satellite communication network, cellular network, or RFID sensors. In this manner, the actual usage may be based on information as recent as the last communication received from the machine.

In one embodiment, machine usage may be established in response to the actual usage, and an estimated usage of the machine. For example, if the actual usage is based on the last time the machine was serviced, then an estimation may be made as to how much the machine has been used since the servicing. The estimated use may then be added to the actual use to determine the machine usage. The estimated usage may be based upon the type of use, the user of the machine, and/or the location of the use, as discussed above.

Therefore, in one embodiment, the amount of usage for each machine (i.e., each part) in use (e.g., manufactured and/or sold or leased) may be established.

In a third control block 106, a service characteristic associated with the part is established. A service characteristic may include a warranty claim, or a service report. A service report may include information associated with a part failure, or preventative maintenance associated with the part. Therefore, in one embodiment, the service characteristic is established based on a service action taken on the particular part. In an alternative embodiment, the service characteristic for a particular part may be a service characteristic associated with the part type in general. For example, recorded data may indicate the warranty or service reports associated with the parts of a particular part type, and then analyzed to establish a service characteristic for the part type in general. The service characteristic associated with the part type in general may also be based upon the type of use of the machine, the location of the machine use, and/or the user operating the machine.

In a fourth control block 108, a reliability characteristic associated with the part may be established in response to the use associated with the part, the amount of usage associated with the part, and the service characteristic associated with the part. In one embodiment, the reliability characteristic associated with the part may be a reliability characteristic associated with the part type. Alternatively, the reliability characteristic may include proactive characteristics, such as a probability of failure, and/or a probability of success, and/or reactive characteristics, such as a repair frequency. Additional reliability characteristics may include repair hours per part, repair hours per part repair, repair hours per part type, warranty dollars per part, warranty dollars per part failure, warranty dollars per part type, machine availability, and/or warranty dollars to sales ratio for a part type.

Figure 2:
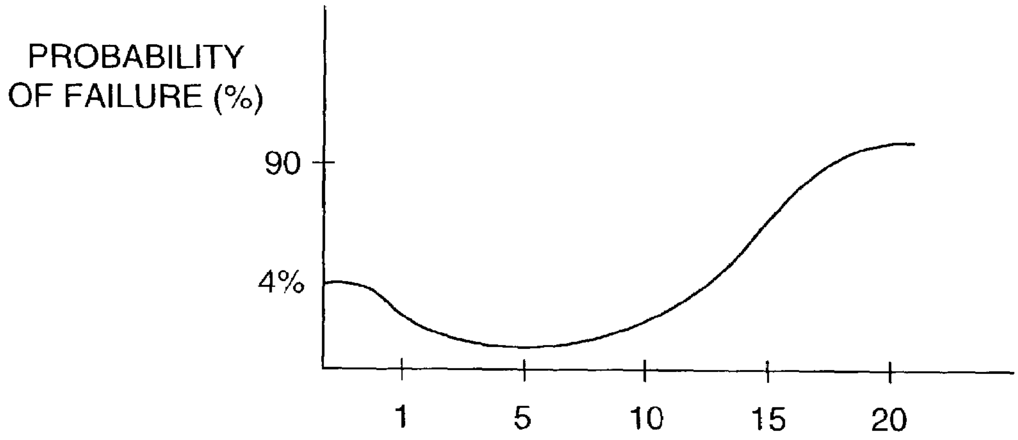
FIG. 2 illustrates a generic probability of failure over a potential life of a part.

In one embodiment, the reliability characteristic may be a proactive characteristic. A proactive reliability characteristic may include a characteristic that may be used to predict what will happen to future parts. For example, probability of failure and probability of success are two types of proactive reliability characteristics. The probability of failure for a part type may be established over the potential life of a part. The probability of failure indicates what the probability is of any given part failing at a particular point in its life, e.g., hours of usage, miles of usage etc. In one embodiment, the probability of failure may be established based on actual failures (i.e., the service characteristics) that have occurred. FIG. 2 illustrates a generic probability of failure over a potential life of a part. As illustrated, the probability of failure during the early portion of the part life may be higher than a middle portion of part life. The reason for this is that there may be a certain percentage of failures due to manufacturing problems. These failures generally happen during the early portion of the life of a part. After the early portion of part life, part failures generally occur due to random, one of kind type of failures. During the later phase of part life, failures occur more frequently due to wear and tear of the part. The wear and tear of a part occurs due to the amount of usage, and type of usage of the part. For example, in one embodiment, service characteristic information associated with the parts of the part type may be collected and analyzed to establish the probability of failure of the part type, or a part in particular. In one embodiment, the warranty claims and/or service reports associated with the parts in use may be analyzed to establish when a part fails. Therefore, in one embodiment, the probability of failure for a part type may be based upon the service characteristics of the parts (e.g., how much usage occurred before the part failed). For example, if the number of parts in use is 100 and 5 fail during the first 50 hours of use, then the probability of failure for a new part during the first 50 hours of use may be estimated to be 5%. In one embodiment, service characteristic information may be further analyzed to correlate the use of the part with the probability of failure. For example, probability of failure may be based upon the type of use the part (e.g., machine) is involved in (e.g., heavy construction, building construction etc., as discussed above), the location of the use (some climates may cause more wear and tear on parts, e.g., salt from the ocean air), and/or user of the machine. Therefore, the general probability of failure for the part type may be 5% at 10,000 hours of usage. However, when a part of this type is used in heavy construction, the probability of failure after 10,000 hours may be 10%. In addition, if one user maintains the machines extremely well, their machines that are used in heavy construction may experience a probability of failure of 6% at 10,000 hour of use. In one embodiment, techniques such as Weibull analysis may be used to determine the probability of failure for a part. Weibull analysis will not be elaborated on since it is known to those skilled in the art.

In one embodiment, the probability of failure may be associated with a specific part. For example, when a machine is sold for the use of heavy construction, the probability of failure of that part type in that use may be applied to the specific part.

In one embodiment, the reliability characteristic includes a probability of success. A probability of success may be determined when no, or few, failures have occurred yet. In one embodiment, the service characteristic associated with a probability of success does not reveal any part type failures. For example, either there are no service reports, warranty claims indicating there is a problem with the part type, or the ones that do indicate the part type failing, are either few in number, or are wrong about the problem identification (i.e., the part type had not failed, some other part had caused the part type to have a problem).

In one embodiment, the repair characteristic includes a reactive characteristic. A reactive characteristic is a characteristic that is associated with the actual reliability of a part type. For example, a repair frequency may be considered to be a reliability characteristic based on the actual frequency of repairs associated with the part type. The number of times a part is being serviced, whether for a warranty issue, part failure other than warranty, or a preventative maintenance issue, and when these events occur relative to the life of the part, may be used to establish a repair frequency. In one embodiment, the repair frequency of parts may be analyzed to determine desired actions that may be taken to extend the life of a part. The repair frequency and/or associated data may indicate an upcoming failure, or failure pattern. In addition, the data collected may indicate that preventive maintenance should be performed more regularly in order to extend part life. In this case, a new preventative maintenance process may be established in response to the established service characteristic.

In one embodiment, the repair frequency of a part type may be used to establish potential upcoming events associated with the part. For example, repair frequency may indicate that machines in heavy construction need to be serviced 100 hours sooner than the machines used in other application, after 5000 hours of machine life. Therefore, if the machine has 5000 hours on it, then the maintenance process may be altered to account for this.

In one embodiment, the repair frequency may be associated with a specific part type. Alternatively a repair frequency may be associated with multiple part types, even complete product lines. For example, in one embodiment, there may be two part types A and B. There may be 500 part types A in the field, and 20 part types B in the field. Then a repair frequency may be determined for the 500 parts (A) and, a repair frequency may be determined for the 20 parts (B). The repair frequency for the two may be the average of the two numbers. Alternatively, the repair frequency of each part (the 500 plus the 20) may be averaged together for a repair frequency for the two part types.

Reliability characteristics have been described as including proactive and reactive characteristics. In one embodiment, depending on the manner of analysis, reliability characteristics such as probability of success, probability of failure, and/or repair frequency may be considered to be either proactive or reactive, and therefore may simply be referred to as reliability characteristics.

In one embodiment, the service characteristic may be used to develop a service agreement with a potential buyer. For example, based on the intended use of the machine and the location of the use, a more accurate measure of machine reliability may be established enabling a more appropriate service agreement to be created. In addition, the potential buyer may be a previous/current user of the machine type, and therefore, the historical aspects of their reliability may be accounted for as well.

In one embodiment, the method of the present invention may be used in a prototype part type to predict the failures that will occur in the field when the part type is released.

In one embodiment, automated notification may be initiated in response to the reliability characteristic. Information associated with the part type may be updated in an automated manner. For example, service related information may be received and used to update reliability characteristics associated with a part type. If one or more of the reliability characteristics being monitored exceeds a threshold, e.g., a value exceeds a threshold, a trend exceeds a threshold, then a user may be notified in an automated manner. User notification may occur via an e-mail, fax, or other form of electronic communication, or it may occur by notifying the user (either textually or visually, e.g., with a graph). For example, a user may be notified when the first failure of a new part type occurs, or when the twentieth failure of a new part type occurred. Alternatively or in addition, the user may be notified when a repair frequency exceeds a threshold, or drops below a threshold, or the rate of increase in a probability of failure increases above a threshold rate of increase.

Figure 3:
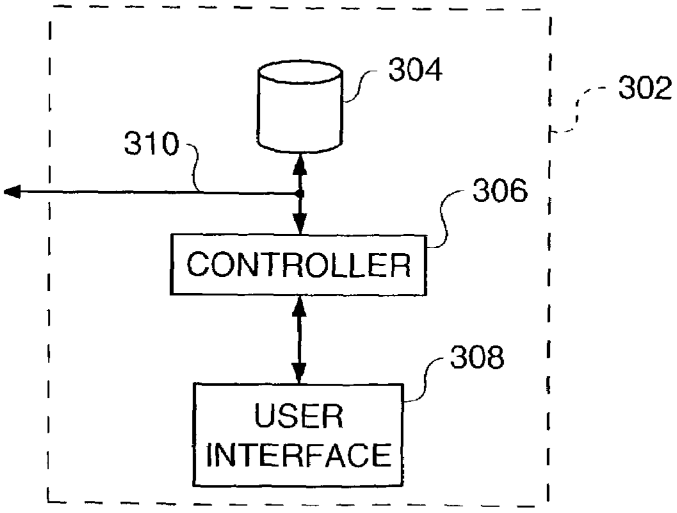
FIG. 3 illustrates one embodiment of a system configured to establish a reliability characteristic associated with a part type.

FIG. 3 illustrates one embodiment of a system 302 configured to establish a reliability characteristic associated with a part type. The system 302 includes a repository 304 configured to store information associated with the part type. The information stored may include a use associated with the part of the part type, an amount of usage associated with the part, and a service characteristic associated with the part. The system 302 includes a controller 306 configured to establish the reliability characteristic associated with the part type in response to the part use, the part usage, and the part service characteristic. In one embodiment, the system 302 includes a user interface 308. In one embodiment, the user interface may be a web enabled interface, as will be discussed below. In addition, in one embodiment, the system 302 is connected to a communication network 310 in order to receive and/or deliver information to an external system (not shown). In one embodiment, the system 302 is configured to establish a reliability characteristic associated with multiple part types as will be described.

In one embodiment, some of the information stored in the repository may have been received from a remote source via the communication network 310. For example, when a part is sold (e.g., a machine), information associated with the use of the part may be determined and electronically delivered to the repository 304. The repository may record the information such that the information is associated with the particular part (e.g., by identifying the serial number of the particular part), and is also associated with the particular part type (e.g., machine model 330B). In addition, the information may have an identifier associating it with the general type of part it is (e.g., forestry machine, heavy construction machine etc.). In one embodiment, additional information may be delivered to the system 302, such as the sale price of the machine, the purchaser of the machine, the intended use of the machine, the location the machine will be used in, etc. The information may be stored in the repository. In one embodiment, the information is received electronically from the organization (or representative thereof) who sold the machine. Alternatively, the information may be obtained and manually entered via the user interface 308.

Figure 4:
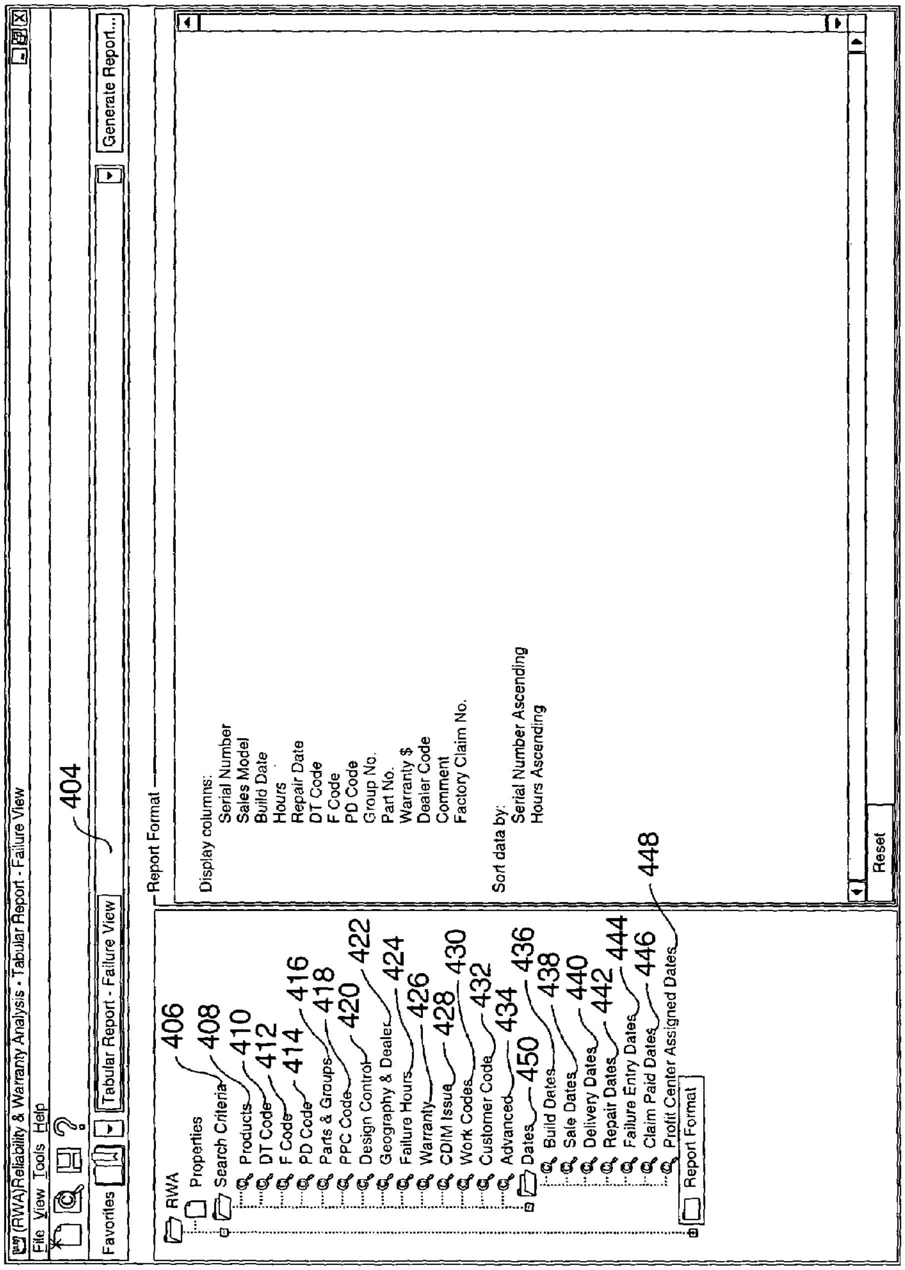
FIG. 4 illustrates one embodiment of a web-based user interface associated with the present disclosure.
Figure 5:
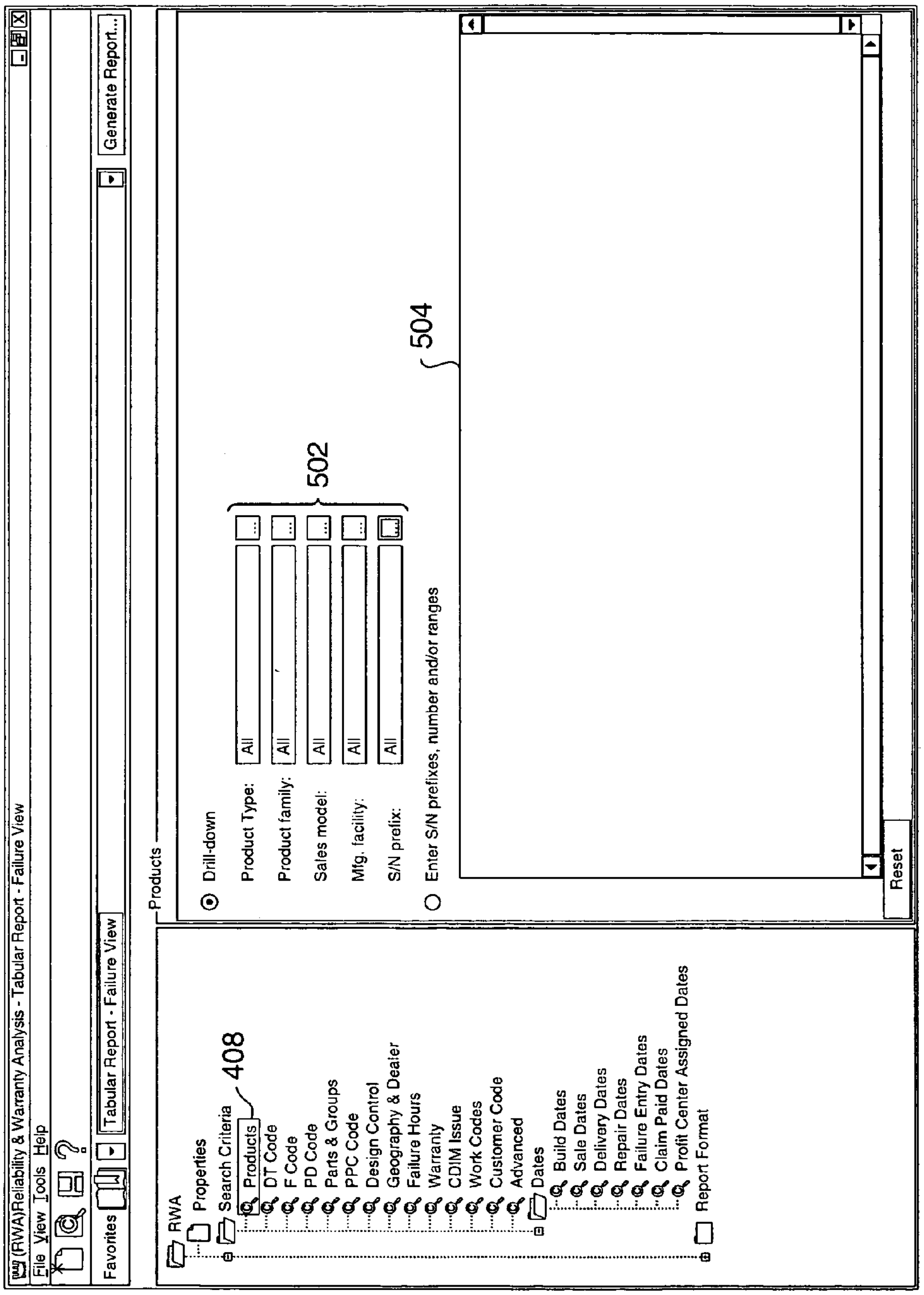
FIG. 5 illustrates an input screen associated with product information.
Figure 5A:
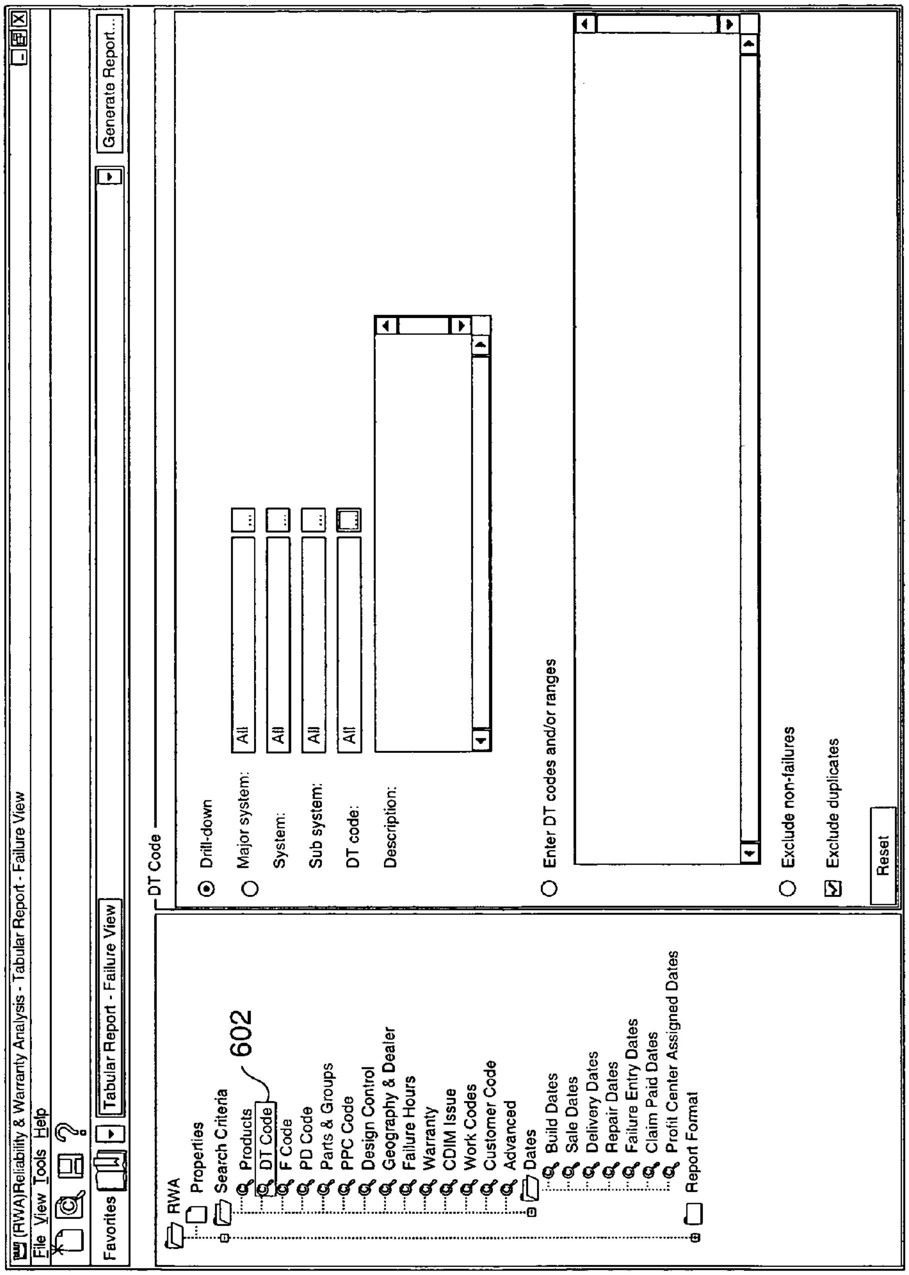
Figure 6B:
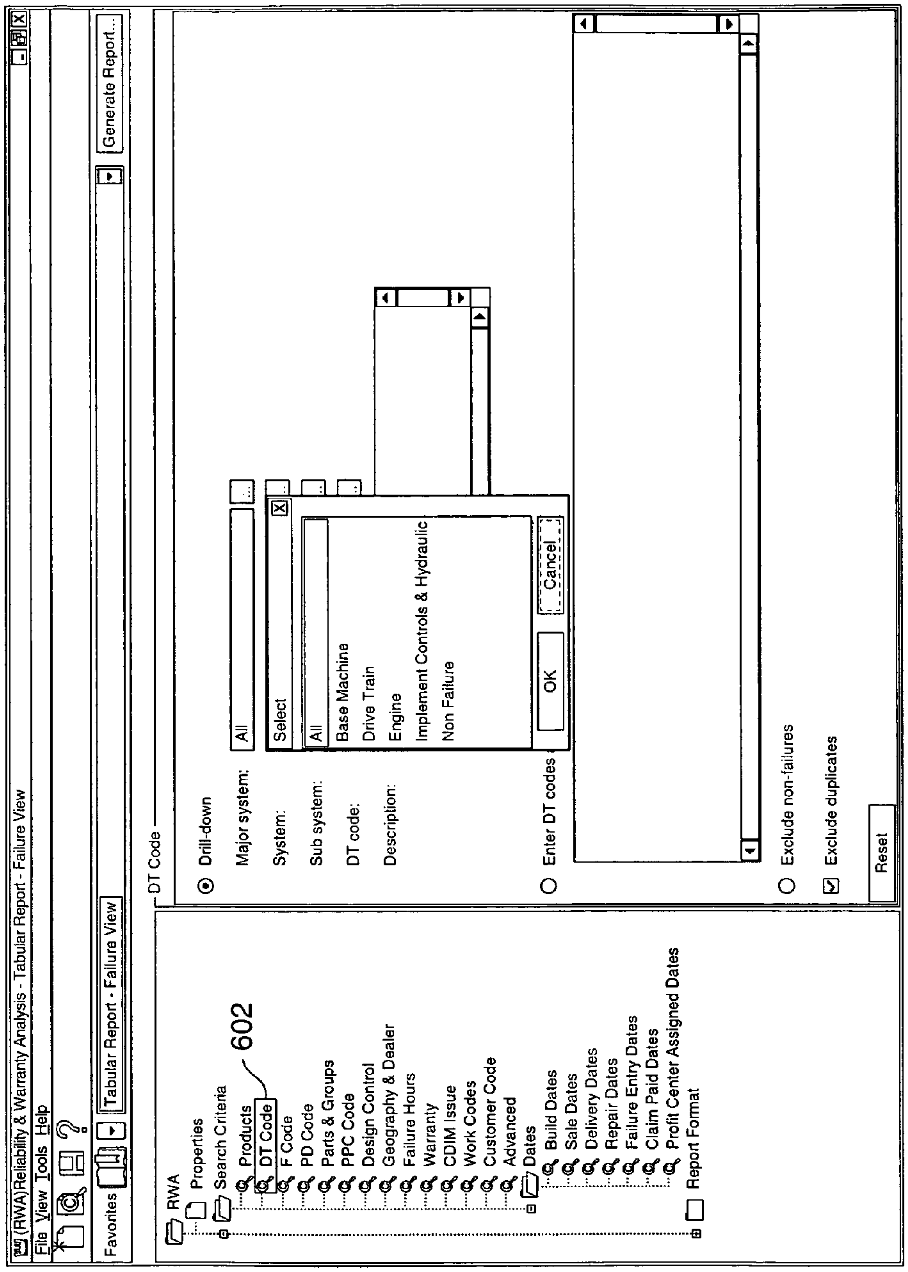
Figure 6C:
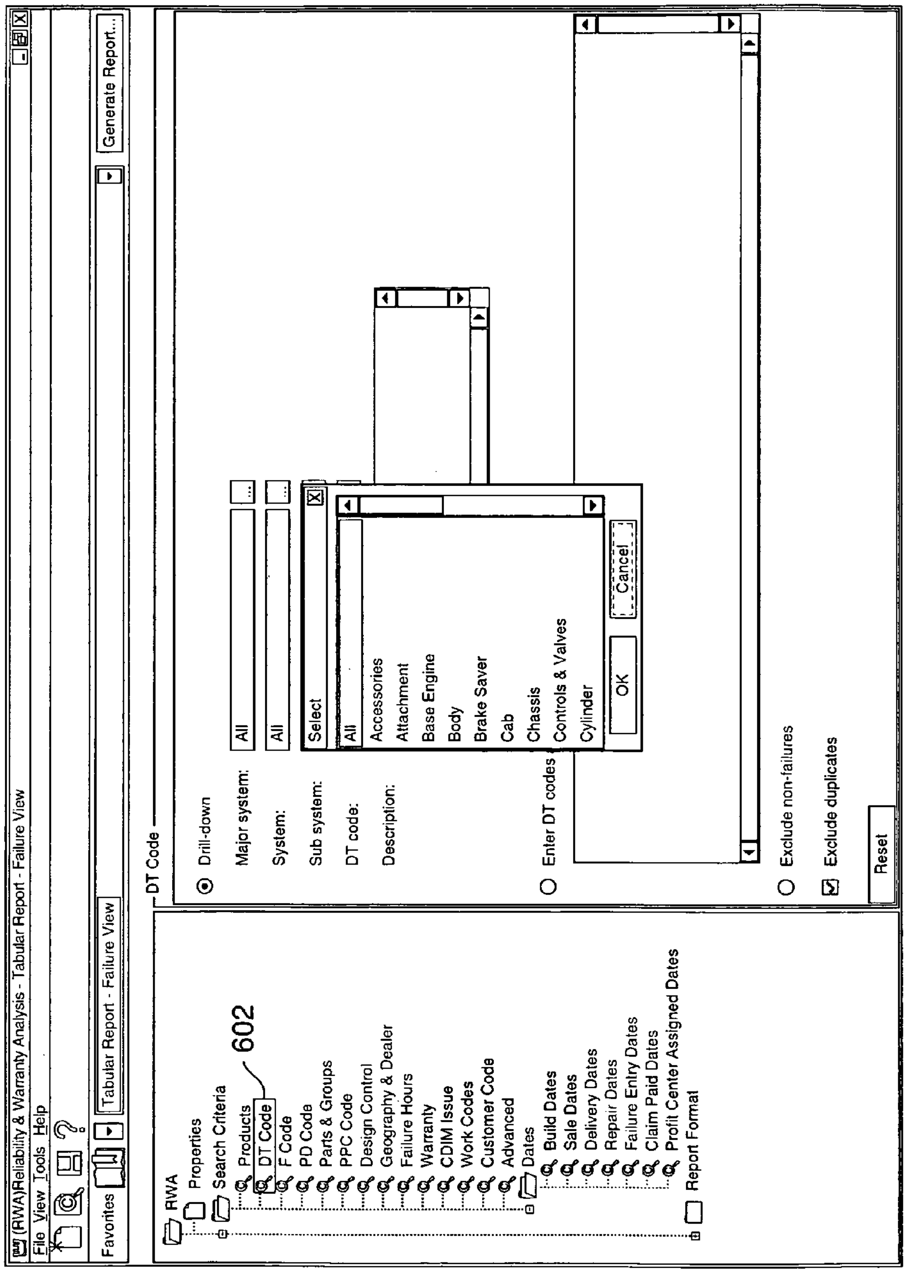
Figure 6D:
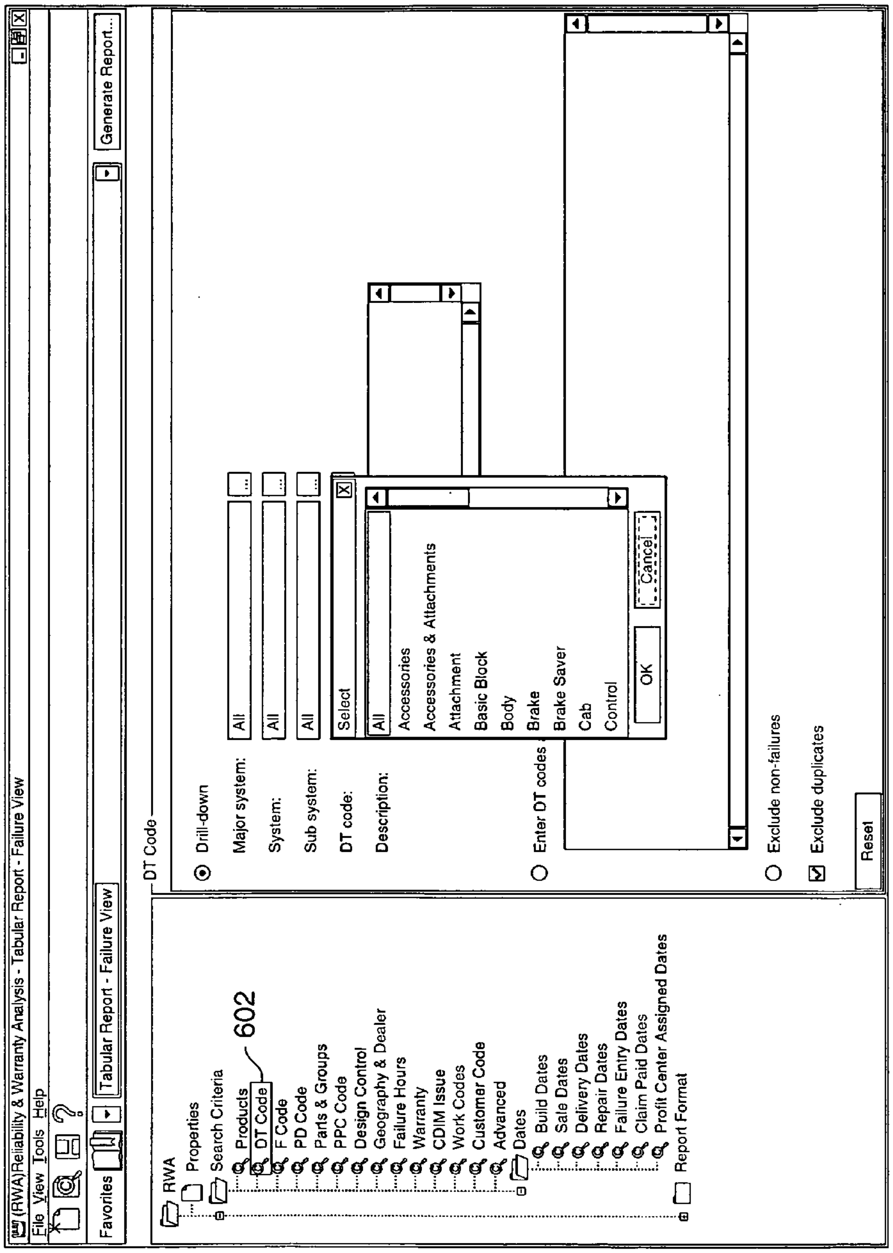
Figure 6E:
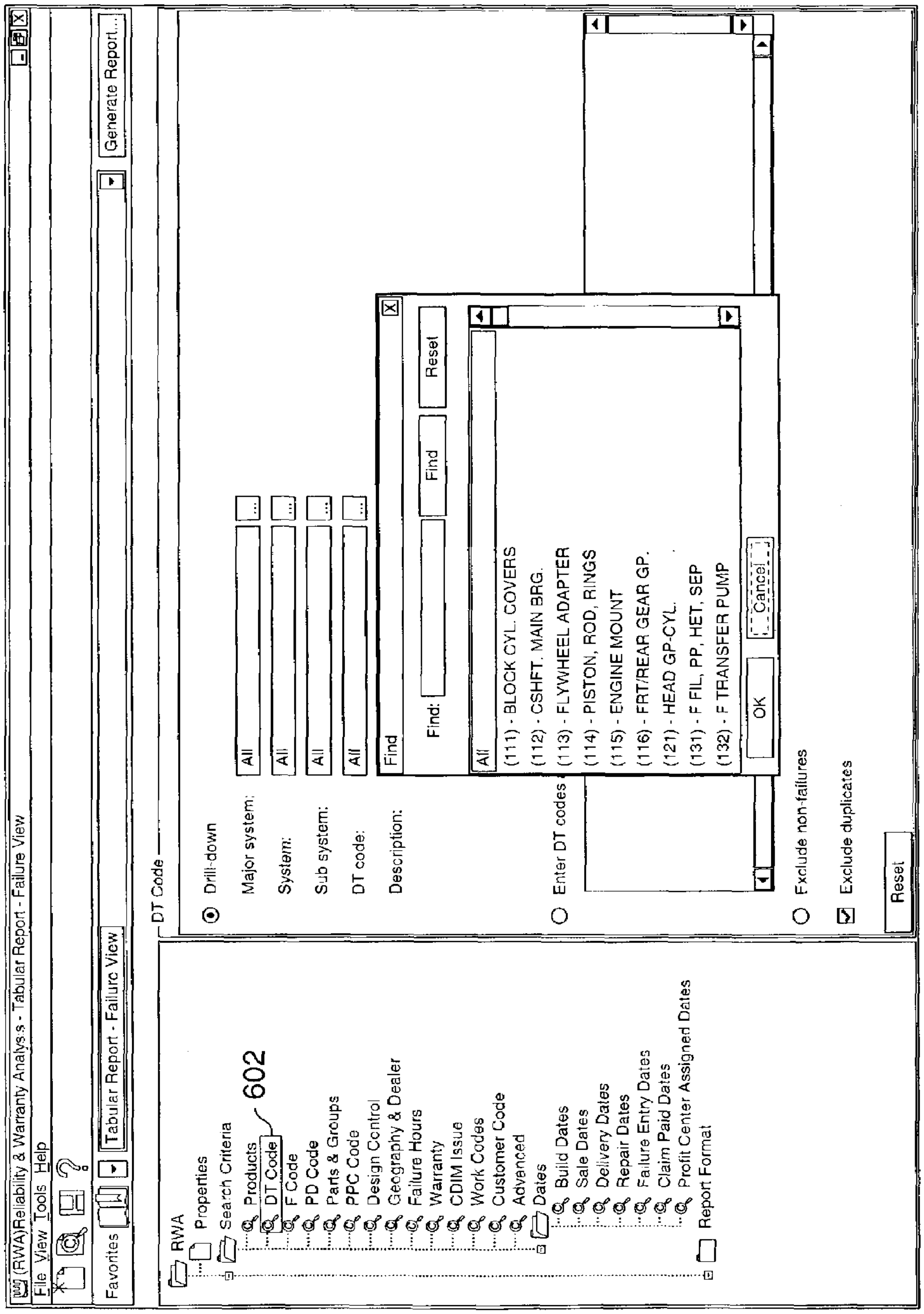

Upon establishment of the data in the system 302 (or accessible by the system 302), a reliability characteristic associated with the part type may be determined. In one embodiment, a user (or controller 306) may establish the criteria of the reliability characteristic being determined. For example, a user may access a web based application, such as that illustrated in FIG. 4, which will enable the user to establish the desired criteria. The property pane 404 enables the user to enter a title for the particular analysis being performed, if desired. A search criteria folder 406 may be provided which includes one or more types of search criteria 408-434 that may be used. For example, FIG. 5 illustrates the display when Products button 408 is activated. As illustrated, the user may establish criteria based on a part type. For example, what type of part it is: construction equipment, generator set engine, truck engine, marine engine, etc. In addition, a model class may be selected. For example, a six cylinder engine may have a model class of C6. In one embodiment, the sales model may be selected. For example, there may be multiple configurations of the six cylinder engine that are sold, and each of these may have a unique model identifier, e.g., C6A, C6B, C6C etc. In addition, a manufacturing facility may be selected. For example, if a company has multiple manufacturing facilities, they may want to analyze the reliability of one or more of the part types being manufactured at a particular facility. In addition, a Serial Number prefix may be selected.

In one embodiment, once a particular product type is selected, e.g., truck engines, the remaining selections will only show the possible products associated with that general product. That is, the product family selection will only display the different families of truck engines, and the sales models will only display the identifiers of the different sales model configurations. In one embodiment, the user may type in the search criteria information in the text entry area 504.

In one embodiment, the user may select criteria based on a portion of a machine through the activation of a division topic (DT) button 602, as illustrated in FIGS. 6A-6E. The portions of the machine may be referred to as systems, sub-systems, or groups of parts types or part types. The additional search criteria may include major systems, sub systems and/or division topic codes.

Figure 7A:
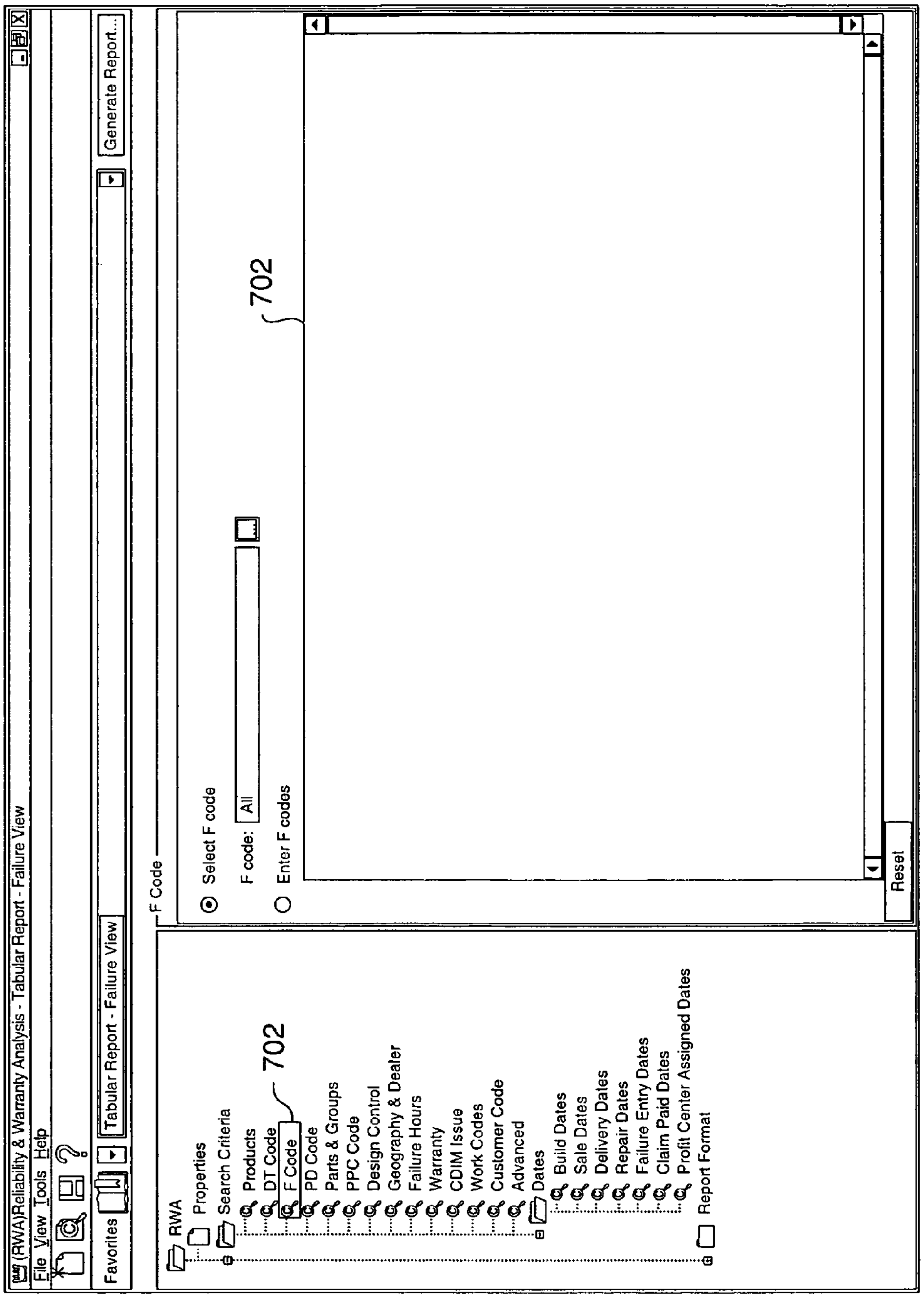
FIGS. 7A and 7B illustrate input screens associated with failure codes.
Figure 7B:
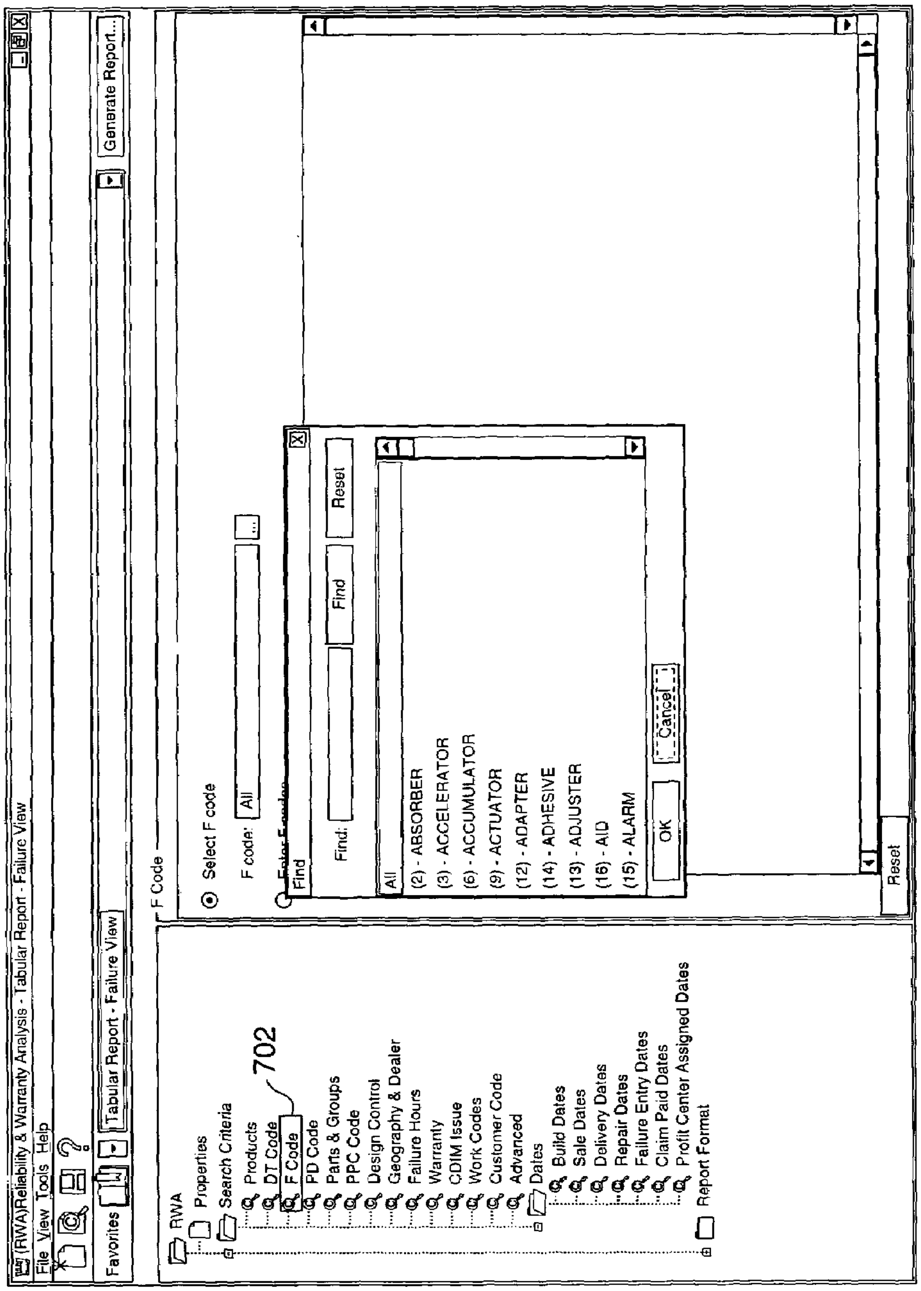

In one embodiment, search criteria based on failure codes (F Codes) may be established (F Code button 702), as illustrated in FIG. 7A-B. For example, when a machine is serviced, the report may have a failure code associated with what was determined to be the problem. In addition, the failure code may be the diagnostic code generated by a diagnostic monitor associated with the machine, and later recorded. The failure codes may either be selected from a menu of codes, as illustrated in FIG. 7B, or typed in data entry portion of the display, 702 illustrated in 7A.

Figure 8A:
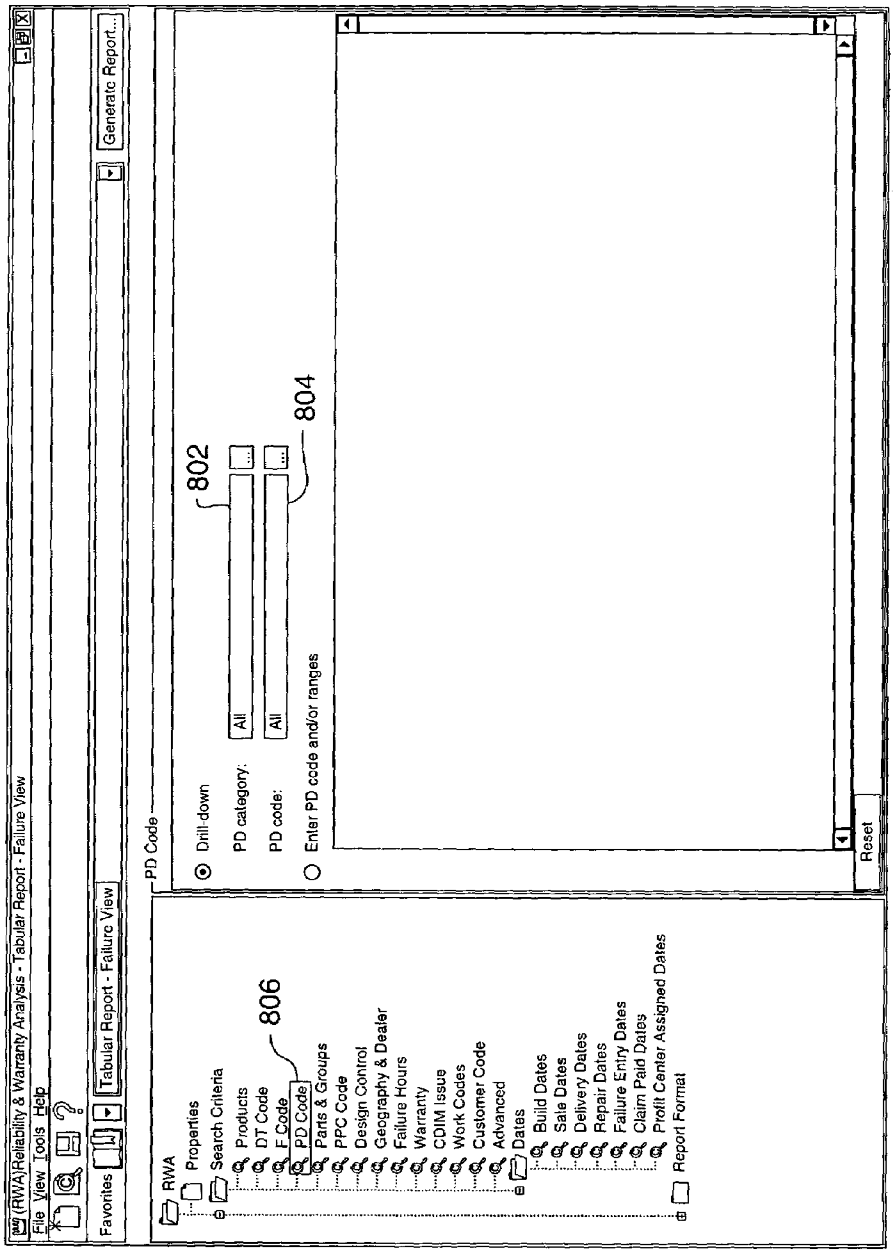
FIGS. 8A, 8B, and 8C illustrate input screens associated with problem descriptions.
Figure 8B:
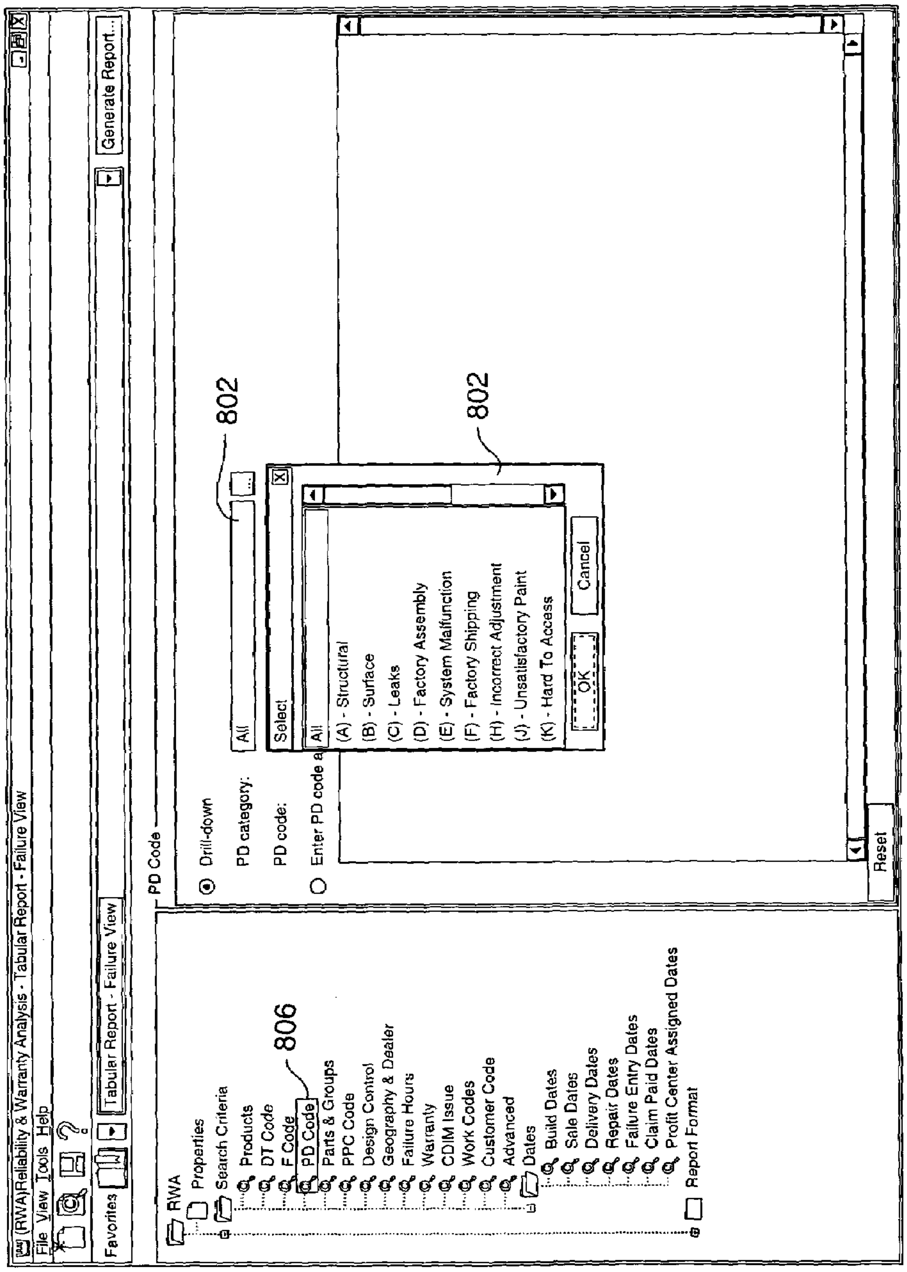
Figure 8C:
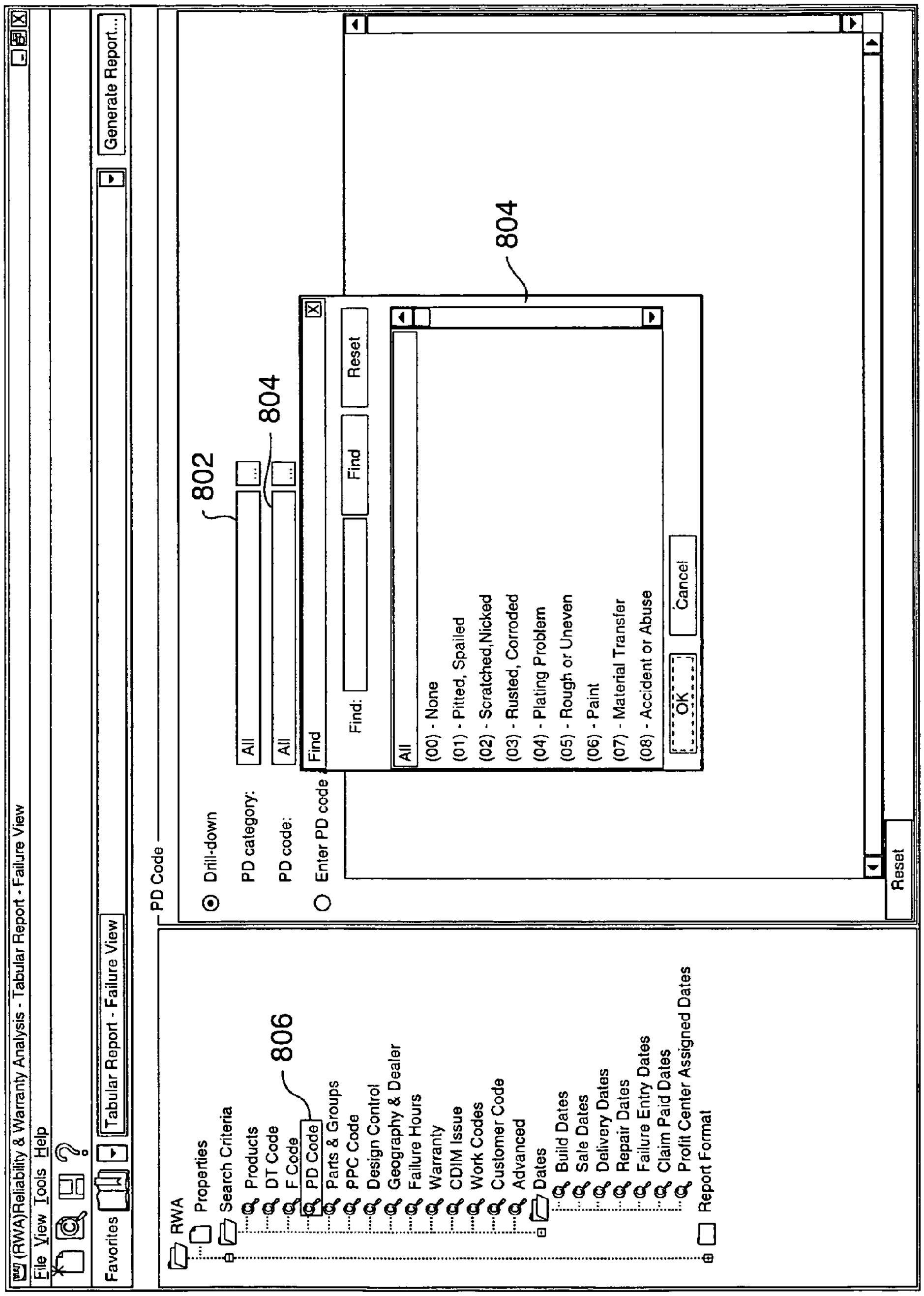

In one embodiment, the search criteria may be performed based on problem descriptions, as illustrated in FIGS. 8A-8C. The criteria may include problem description categories 802, and/or problem description codes 804.

Figure 9A:
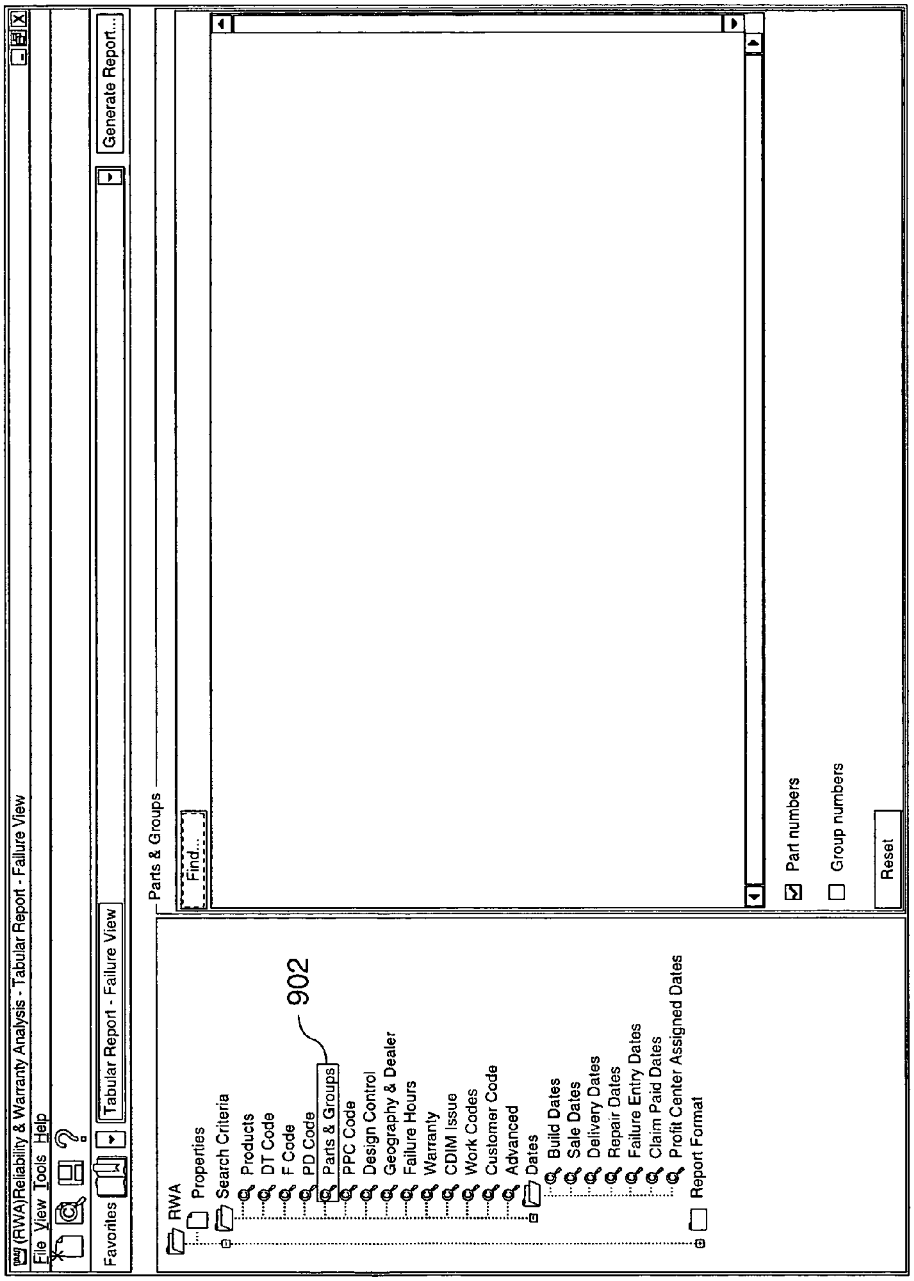
FIGS. 9A and 9B illustrate input screens associated with part searches.
Figure 9B:
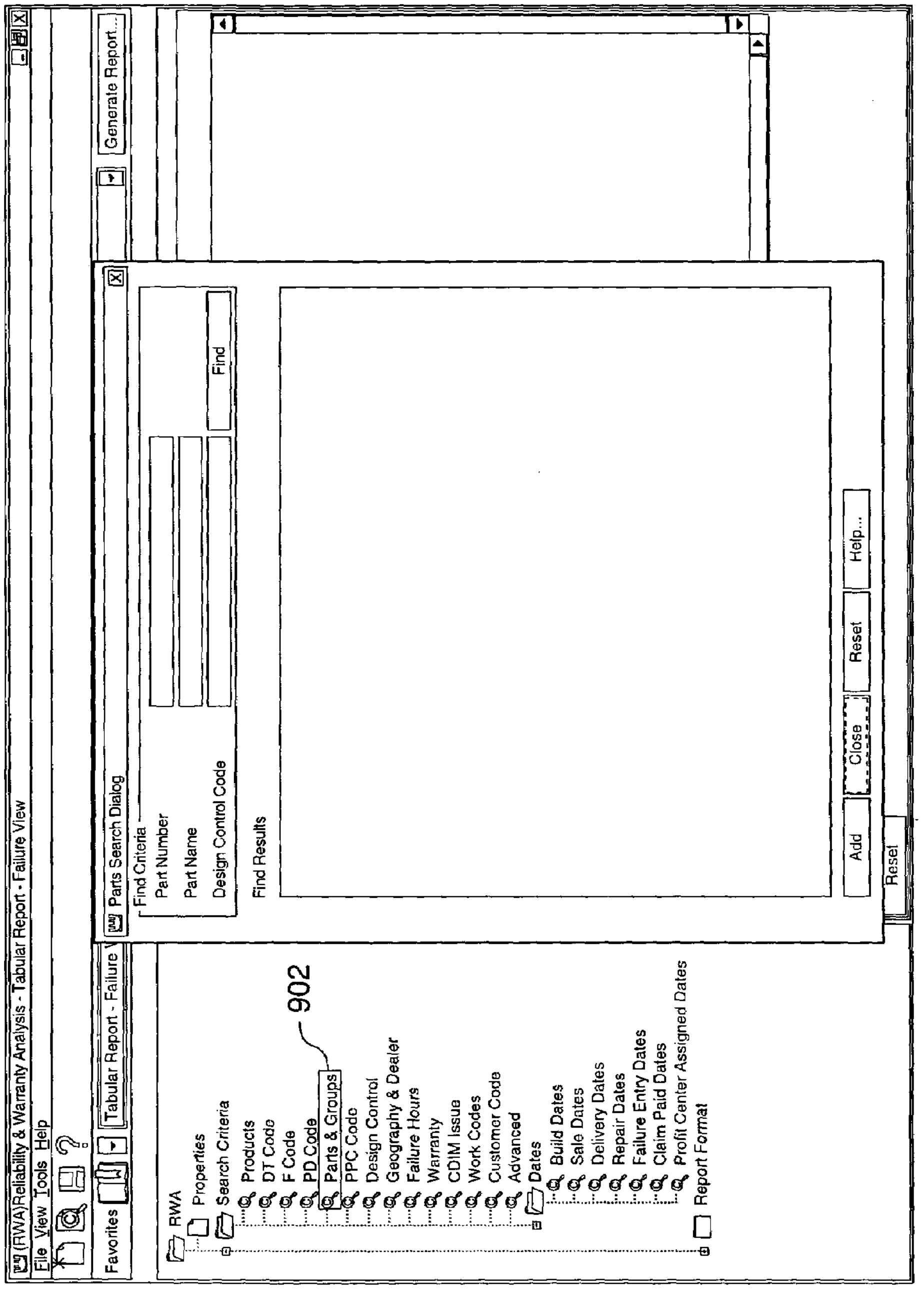

In one embodiment, a search may be performed to identify desired part numbers, types, or categories, that may then be used as search criteria, as illustrated in FIGS. 9A-9B.

Figure 10A:
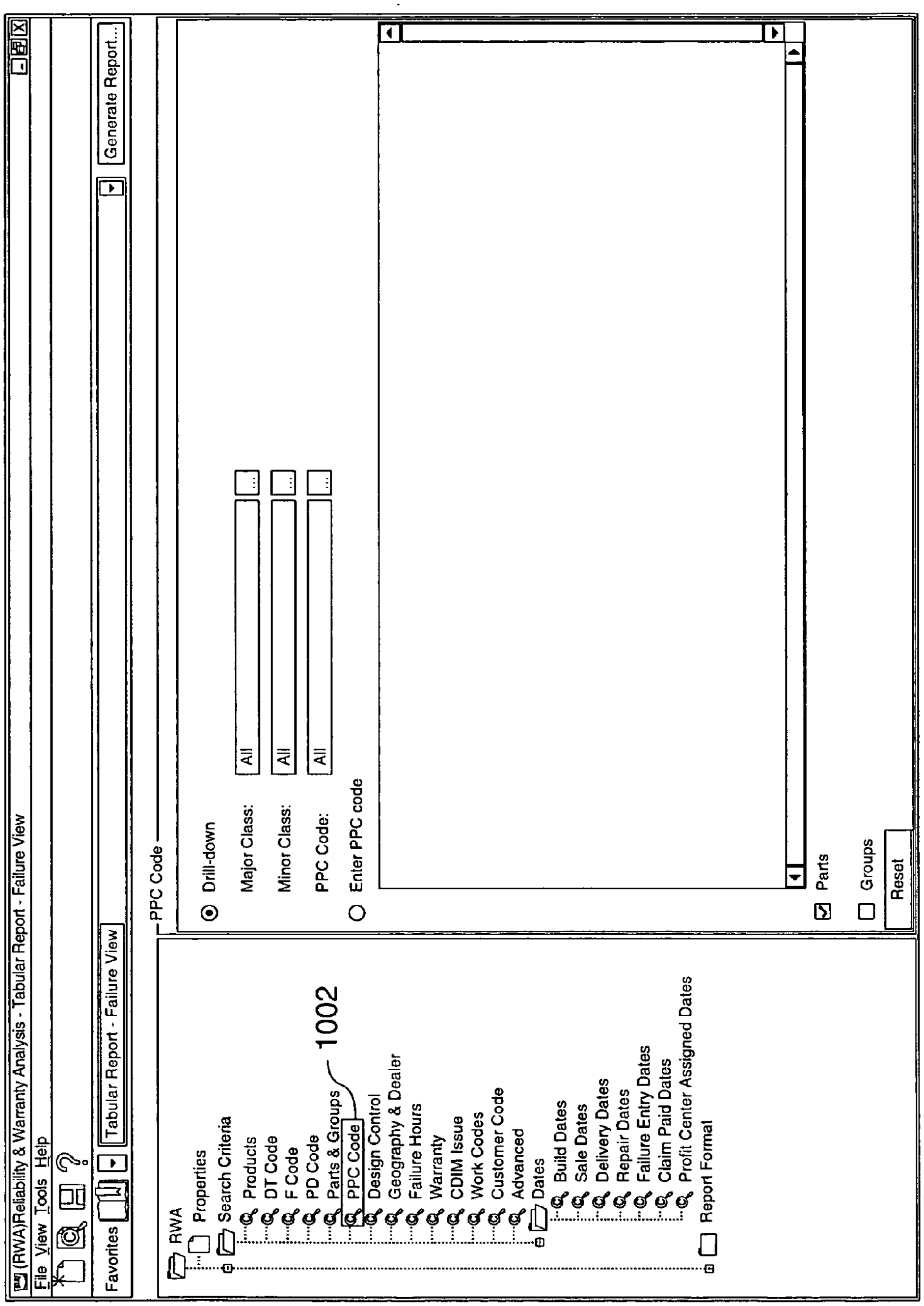
FIGS. 10A, 10B, 10C, and 10D illustrate input screens associated with part purchasing codes.
Figure 10B:
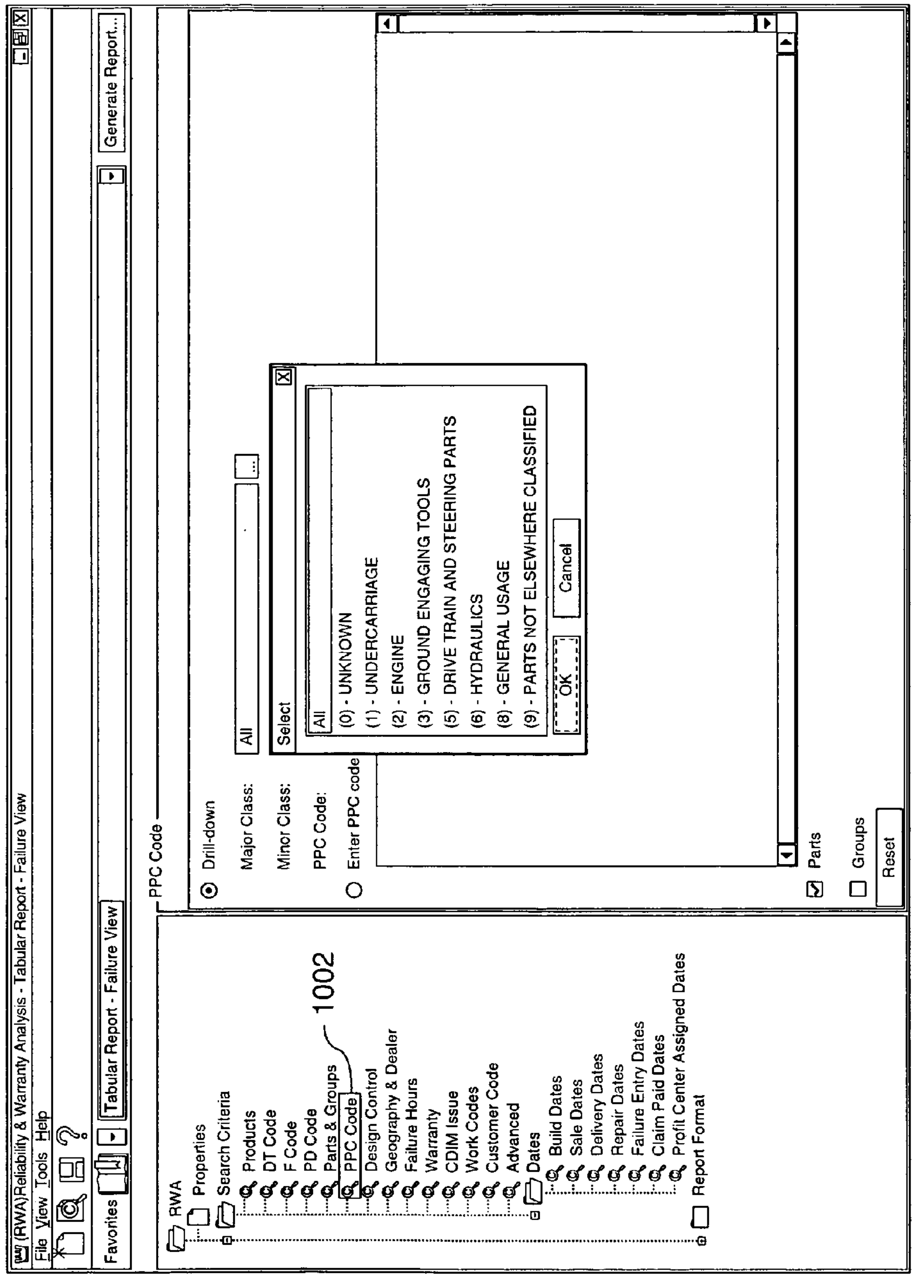
Figure 10C:
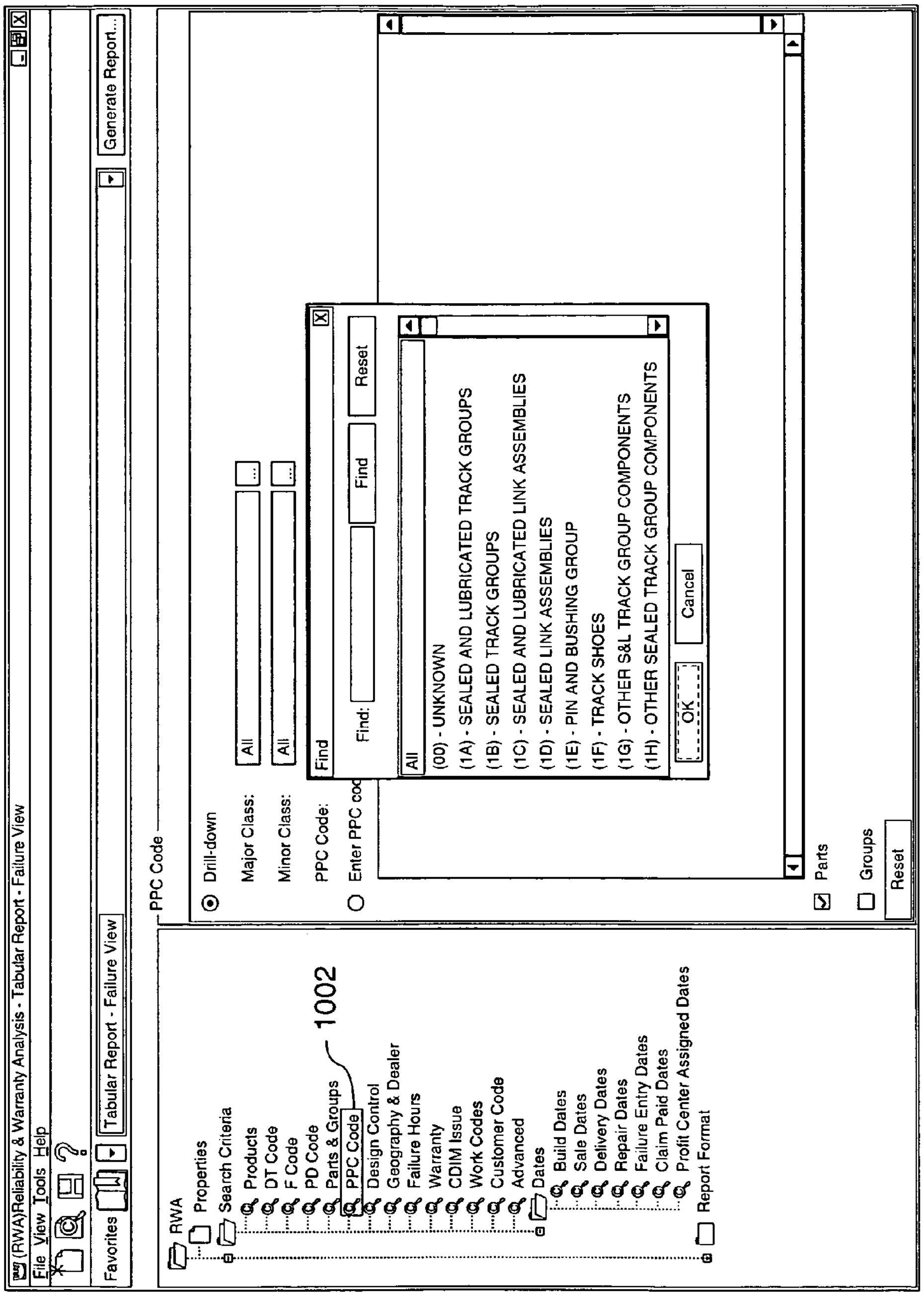
Figure 10D:
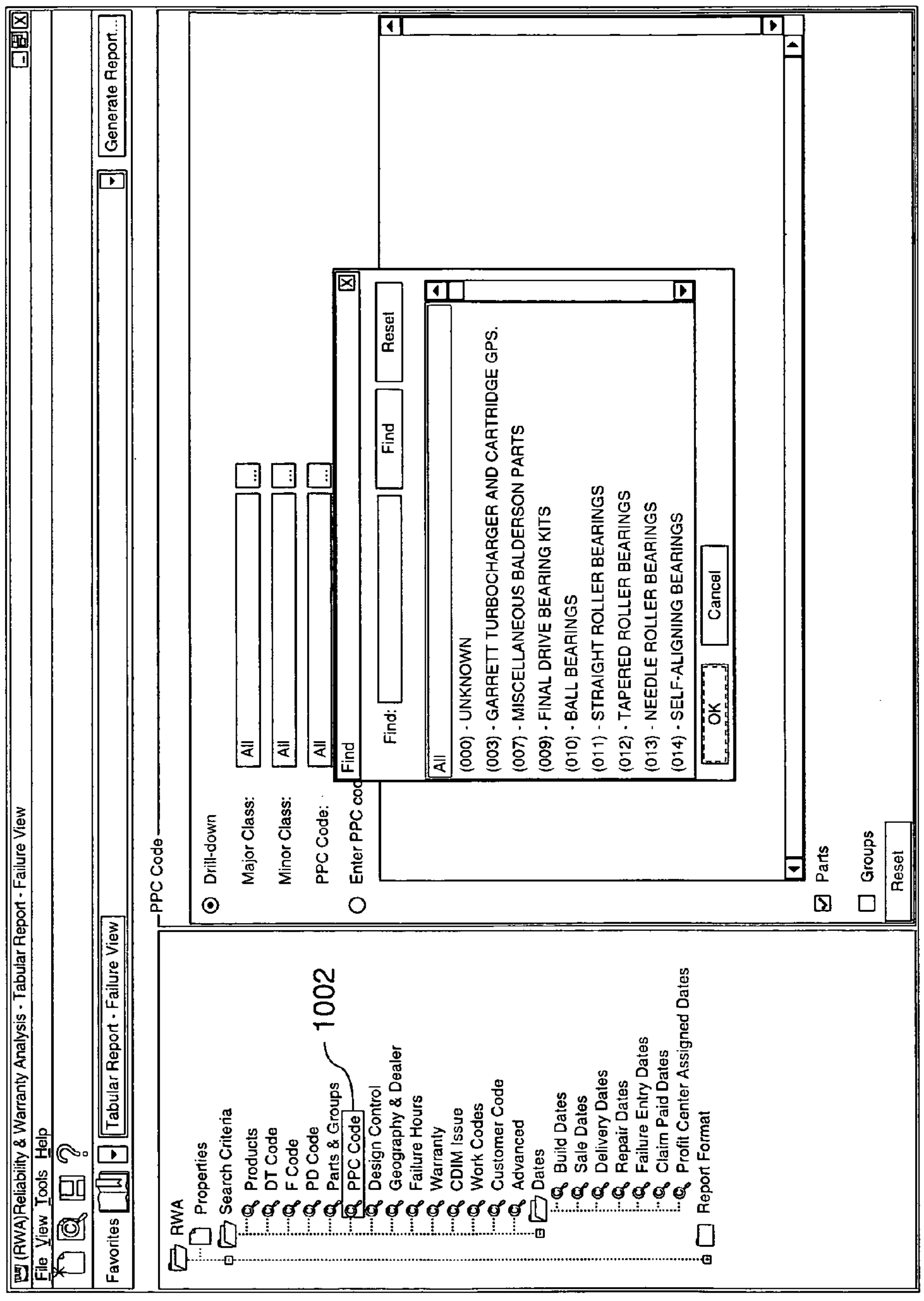

In one embodiment, the search criteria may be established based upon parts purchasing codes, as illustrated in FIGS. 10A-10D. The parts purchasing codes may be used as search criteria based upon major classes, minor classes (or sub classes), and the actual parts purchasing code used, as illustrated in FIGS. 10B-10D respectively.

Figure 11:
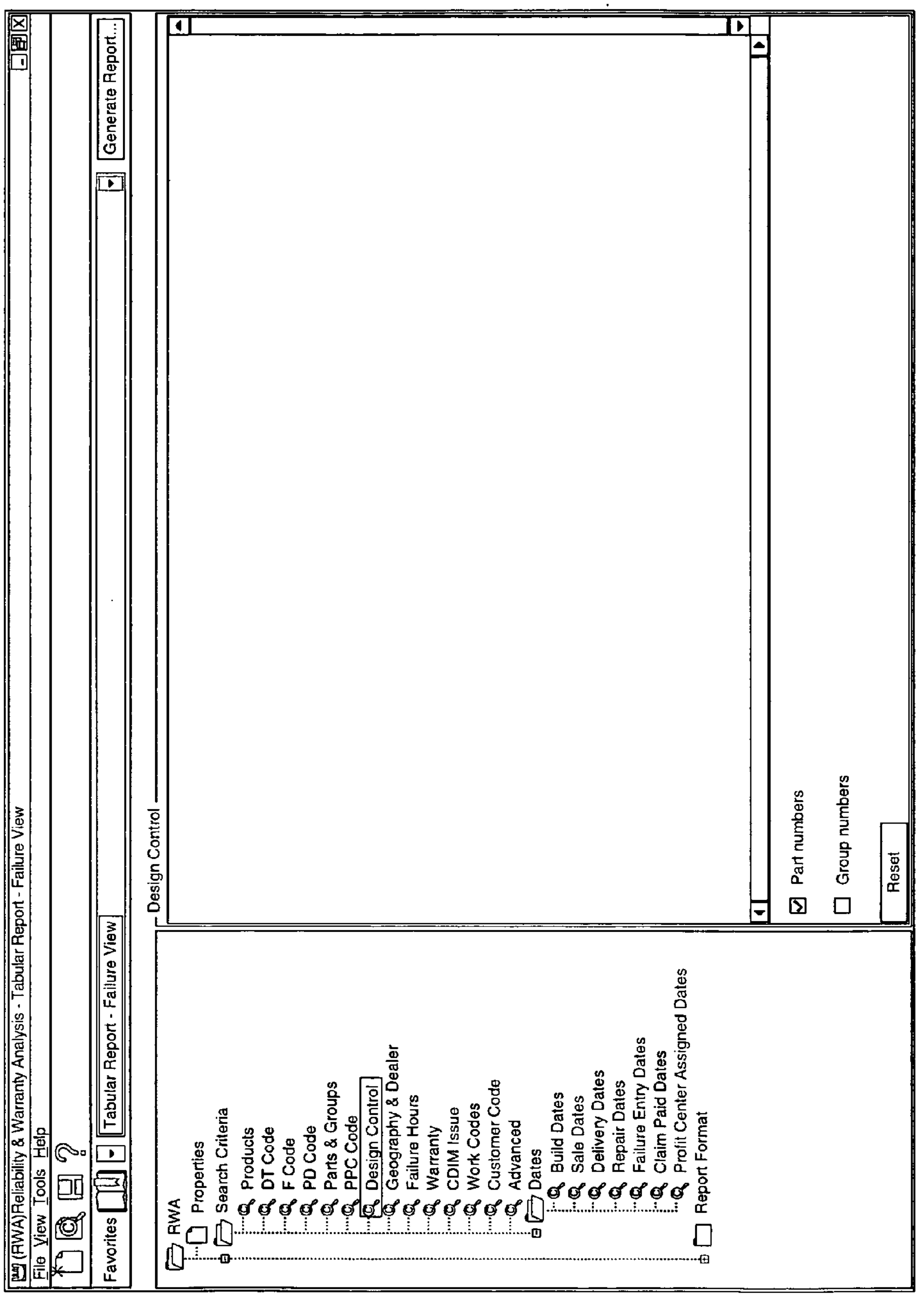
FIG. 11 illustrates an input screen associated with design control characteristics.

In one embodiment, the search criteria may be established based upon a design control characteristic, as illustrated in FIG. 11. The design control characteristic may include the design control center responsible for the design of the part type, or a group of part types.

Figure 12:
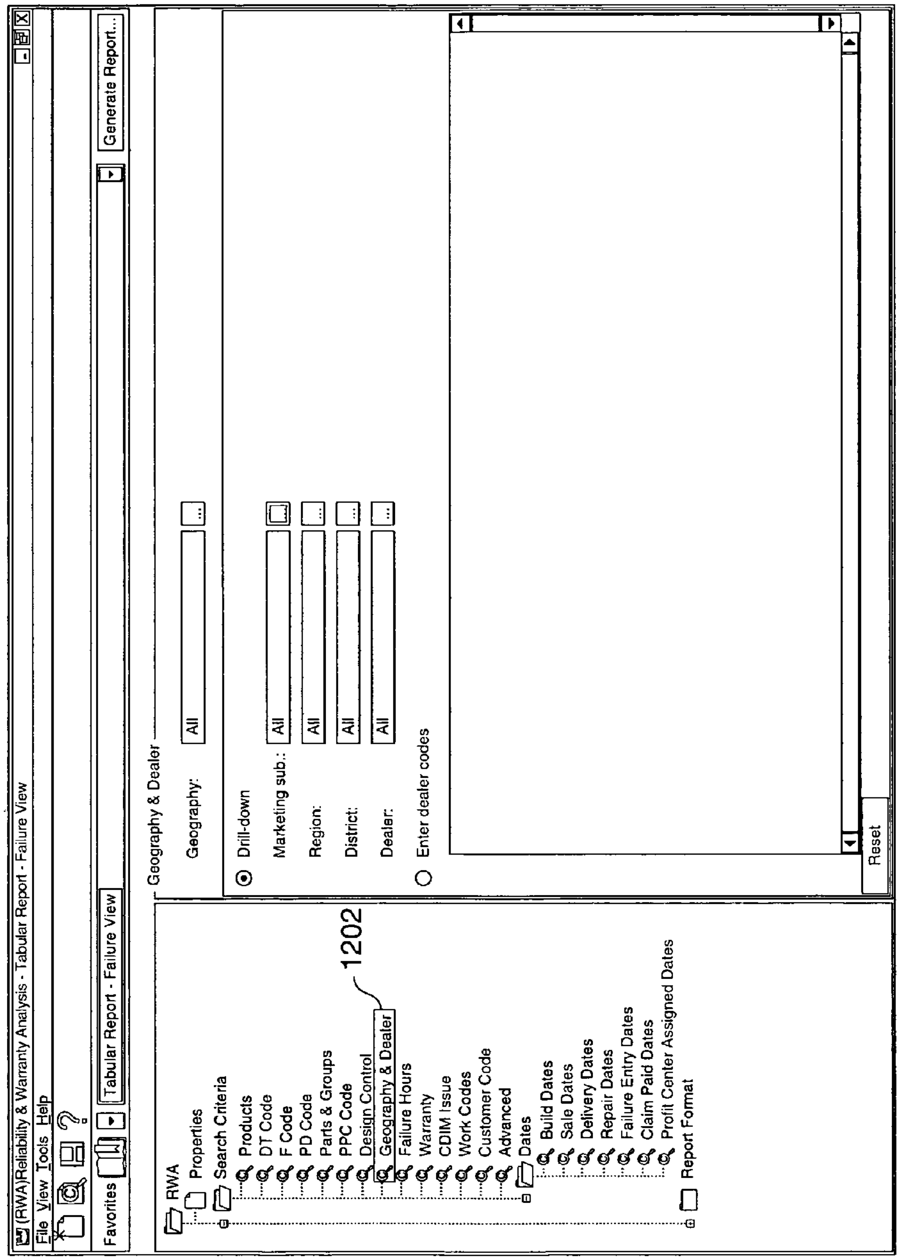
FIG. 12 illustrates an input screen associated with failure location information.

In one embodiment, the search criteria may be established based upon the location of the failure, e.g., the location where the failure was repaired, as illustrated in FIG. 12. This search criteria may include the geography the failure occurred in, the marketing group responsible for that geography, and the dealer responsible for that geography, which may include a region and a district identifier.

Figure 13A:
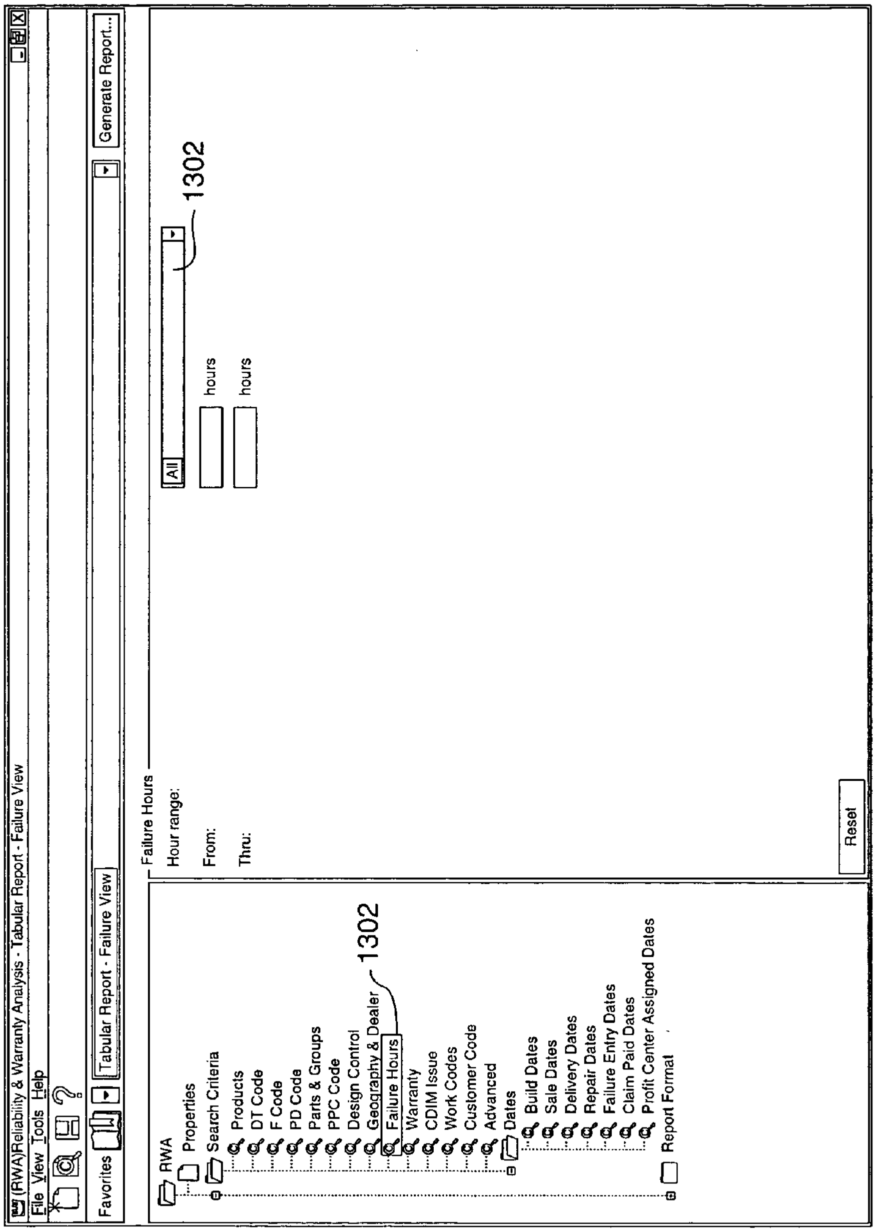
FIGS. 13 A and 13 B illustrate input screens associated with failure hours.
Figure 13B:
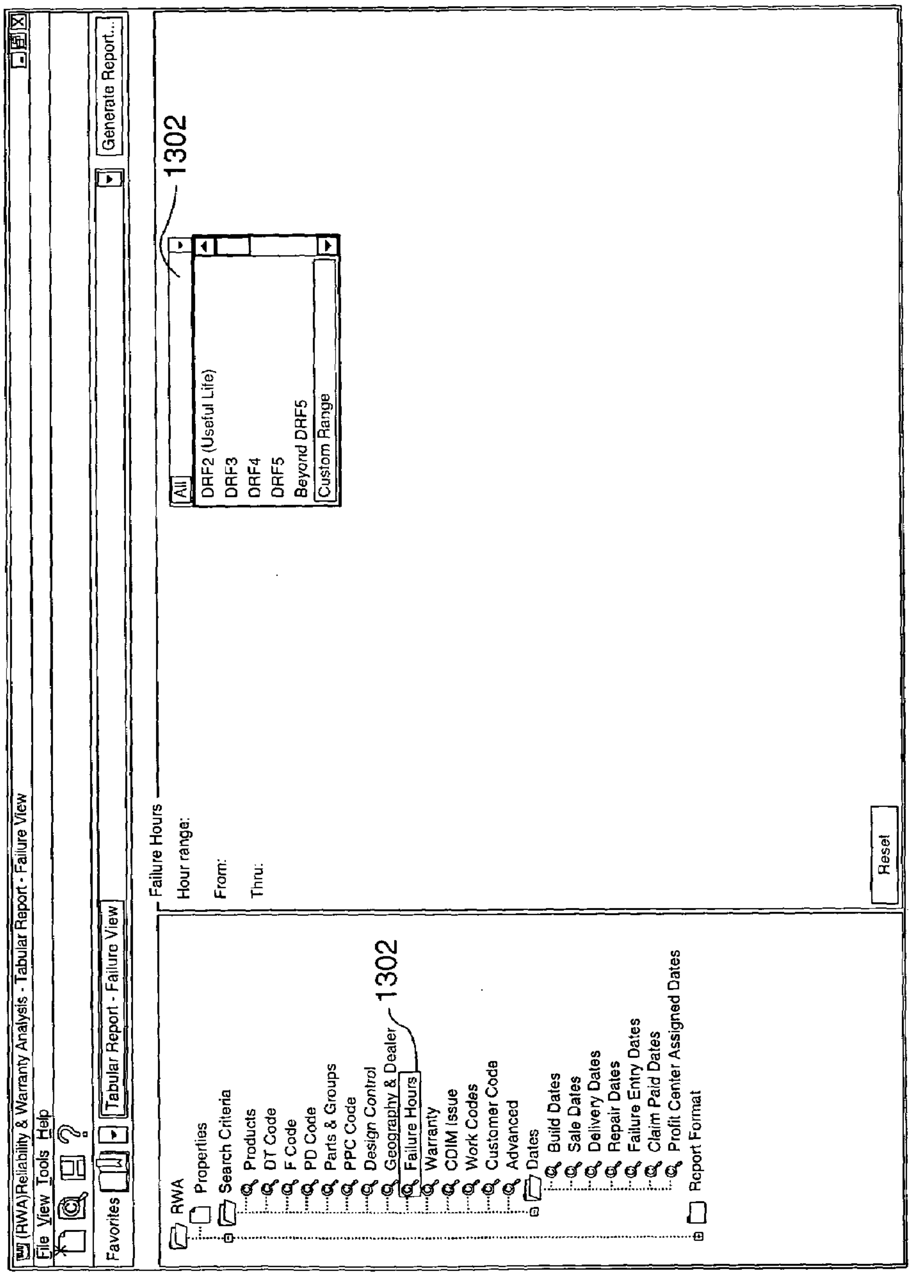

In one embodiment, the search criteria may be based upon the hour the failure occurred in, as illustrated in FIGS. 13A-B. For example, in a pull down menu 1302 different hour ranges may be selected. The ranges may go from a first range covering the infant mortality of the part types, through several phases, or to the end of the life of a part, or may be customized, to illustrate a particular hour range. The pull down menu may illustrate different hour ranges in terms of a dealer repair frequency.

Figure 14:
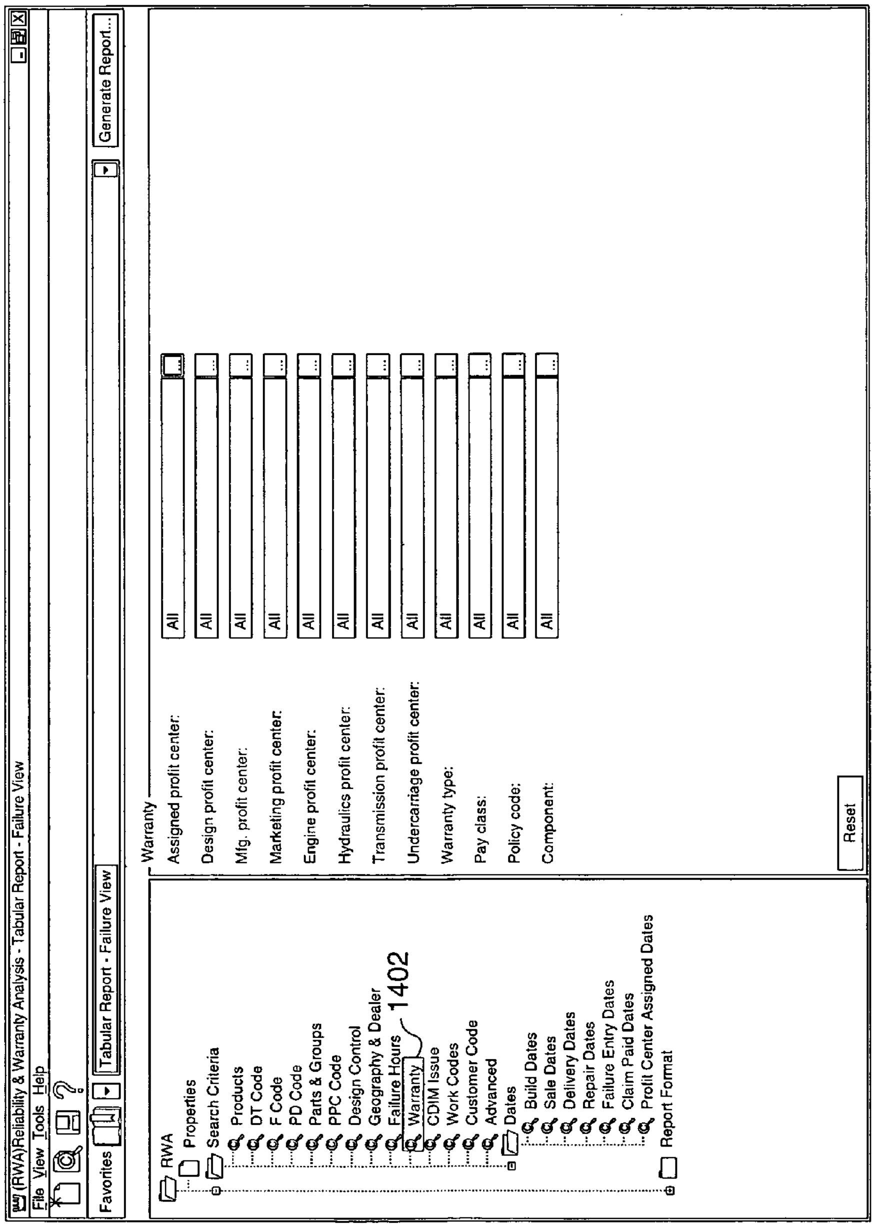
FIG. 14 illustrates an input screen associated with a profit center associated with a part.
Figure 15A:
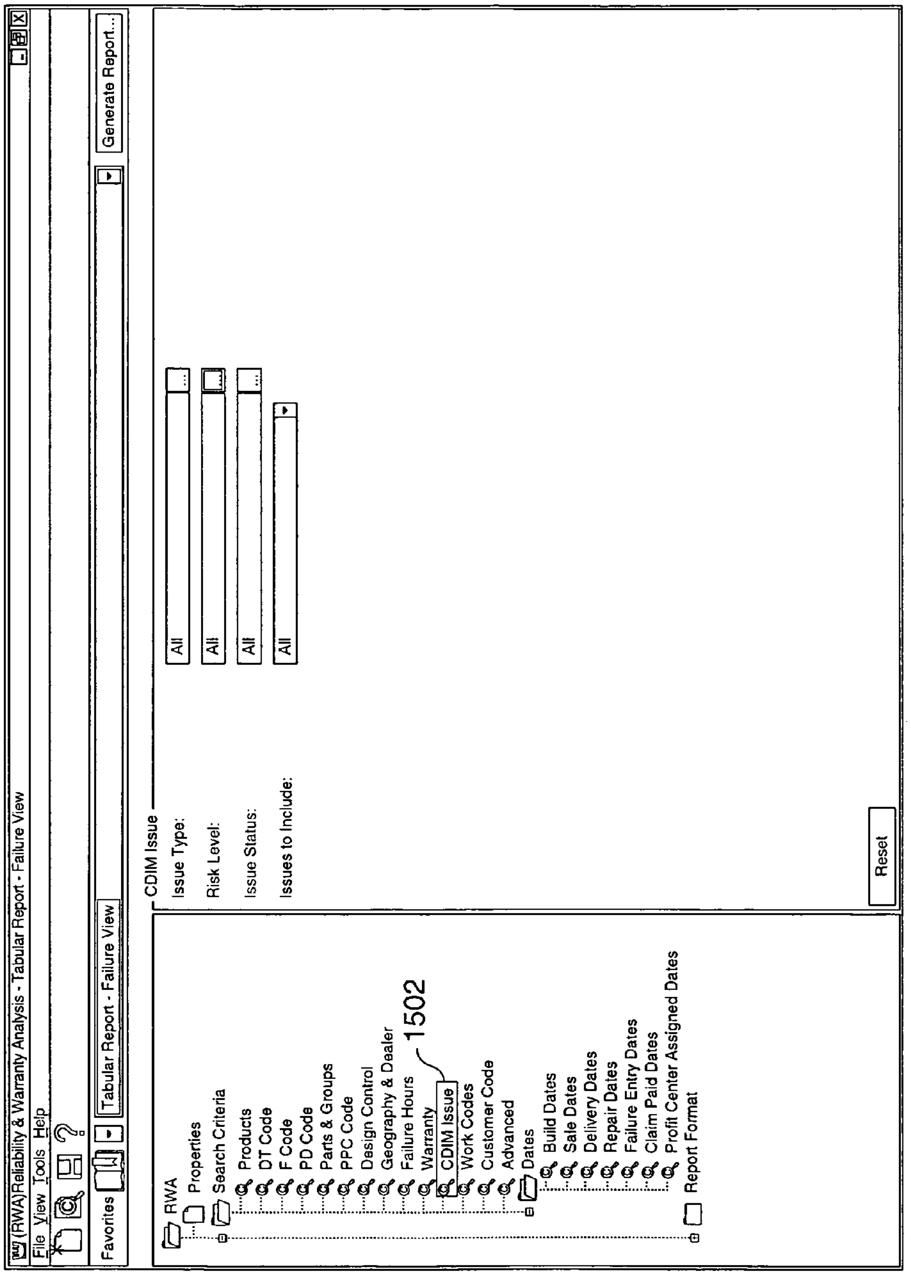
FIGS. 15A, 15B, 15C, 15D, and 15E illustrate input screens associated with issue and/or risk data entry.
Figure 15B:
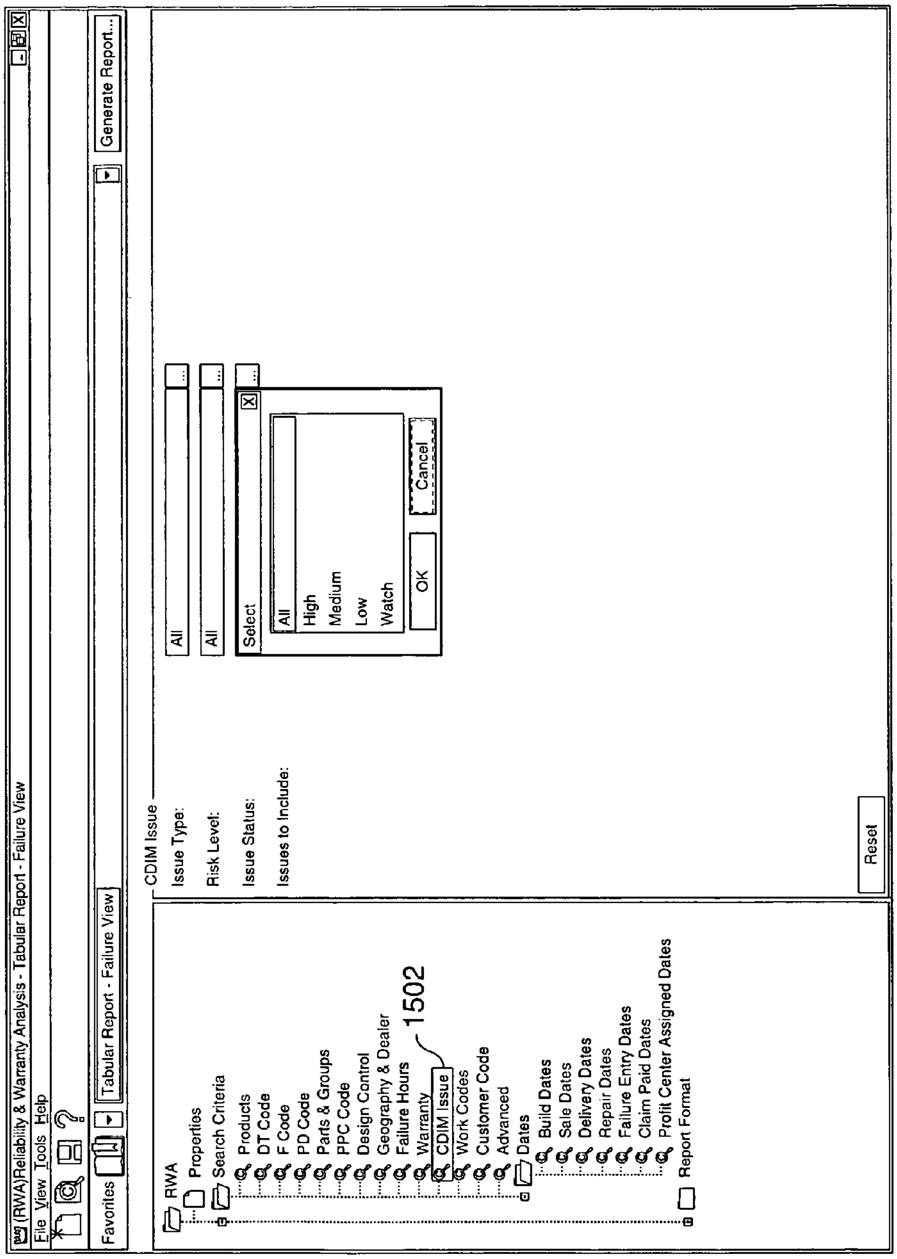
Figure 15C:
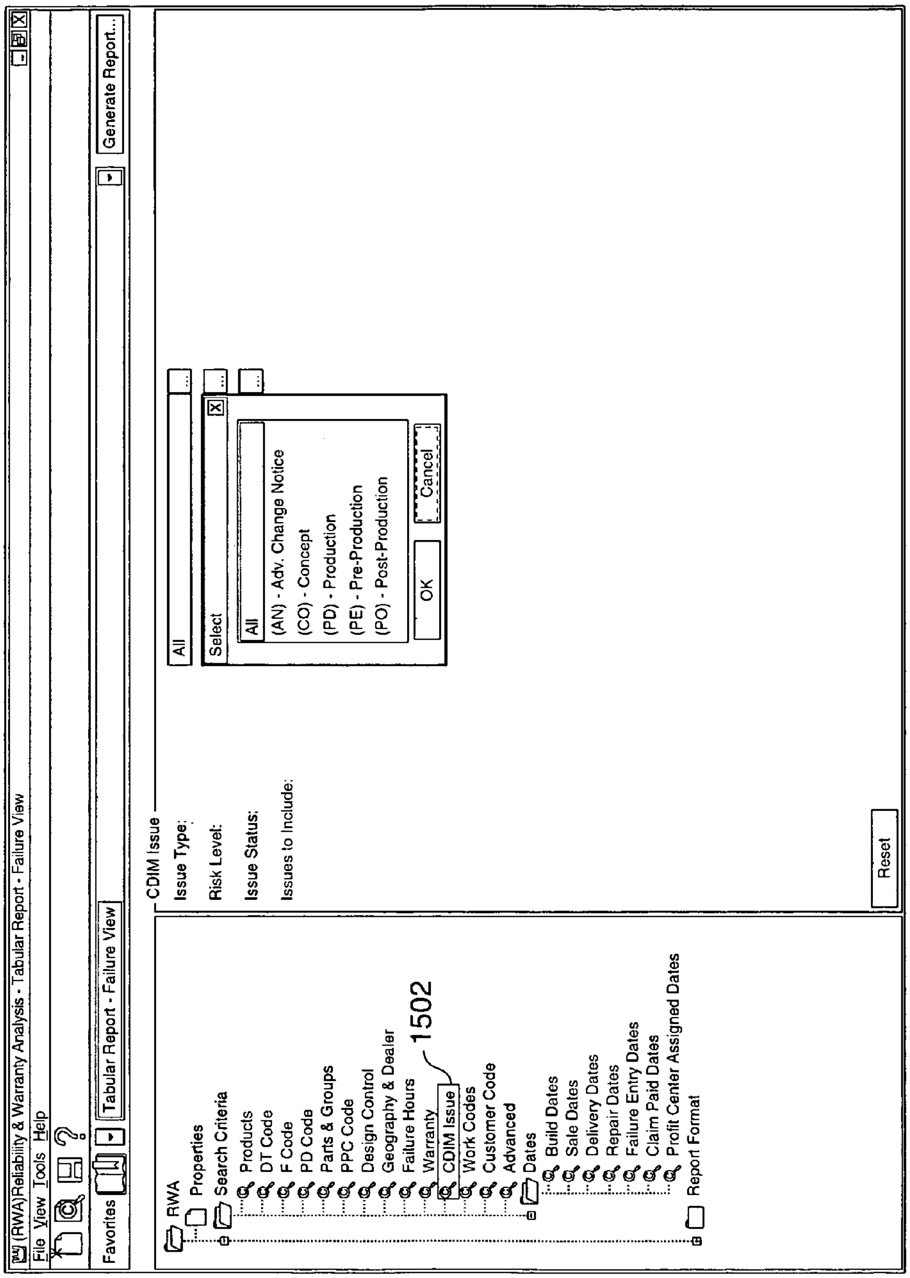
Figure 15D:
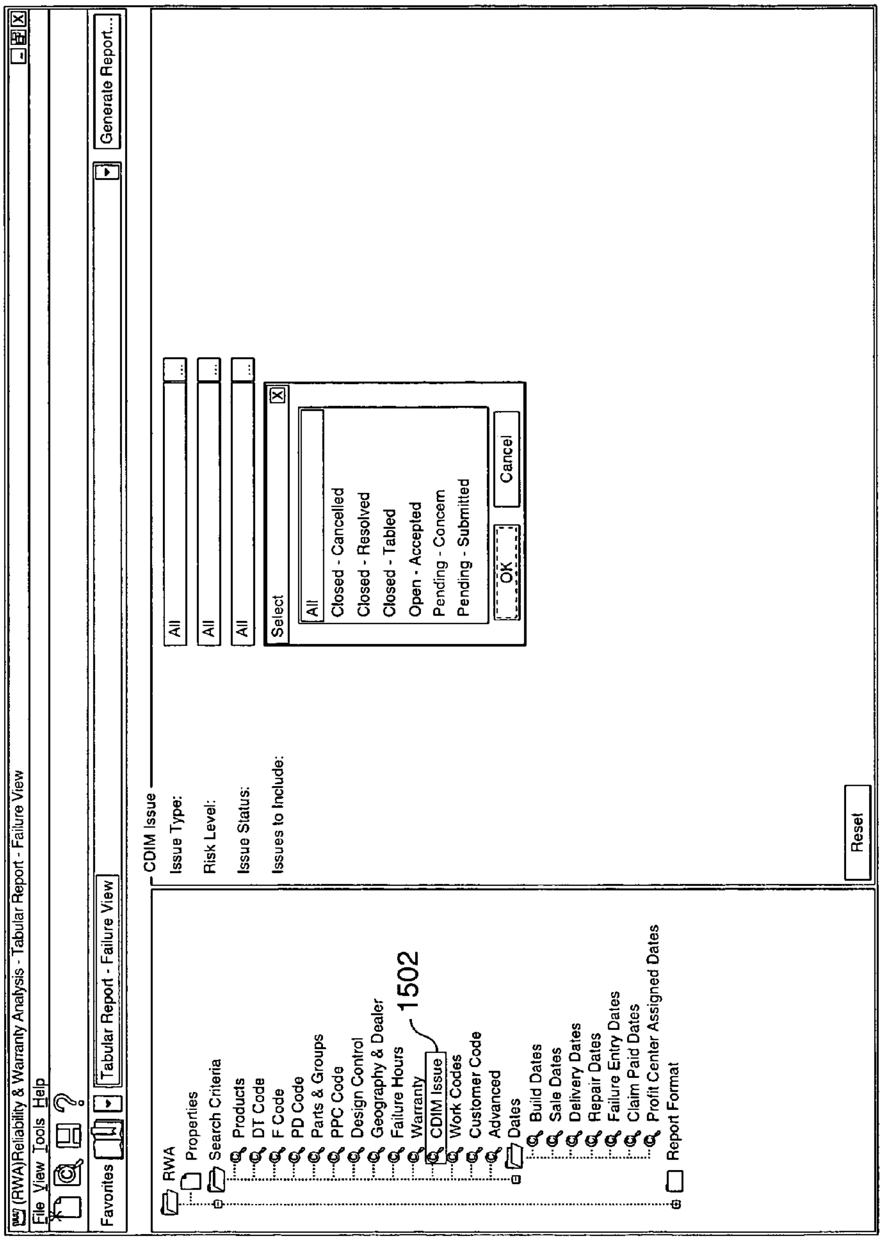
Figure 15E:
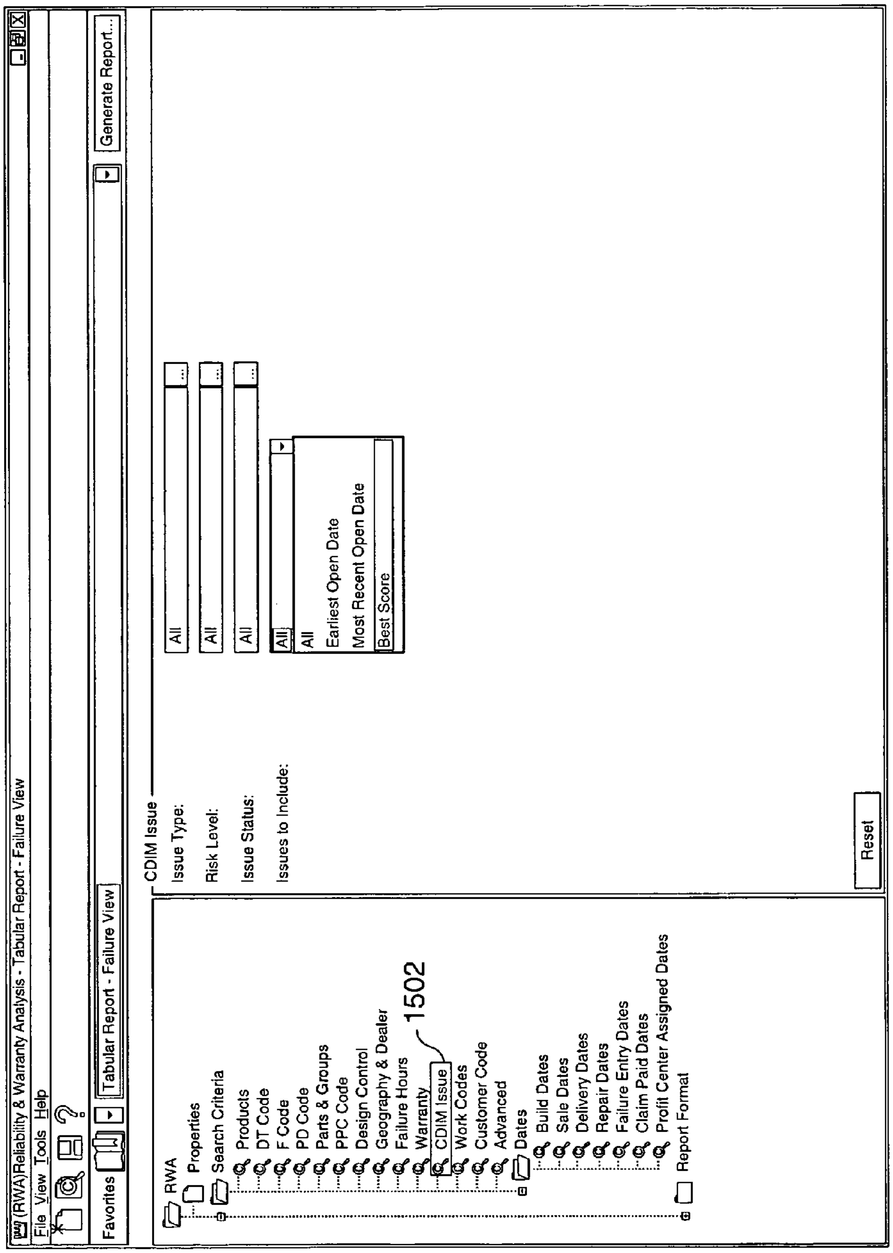
Figure 16A:
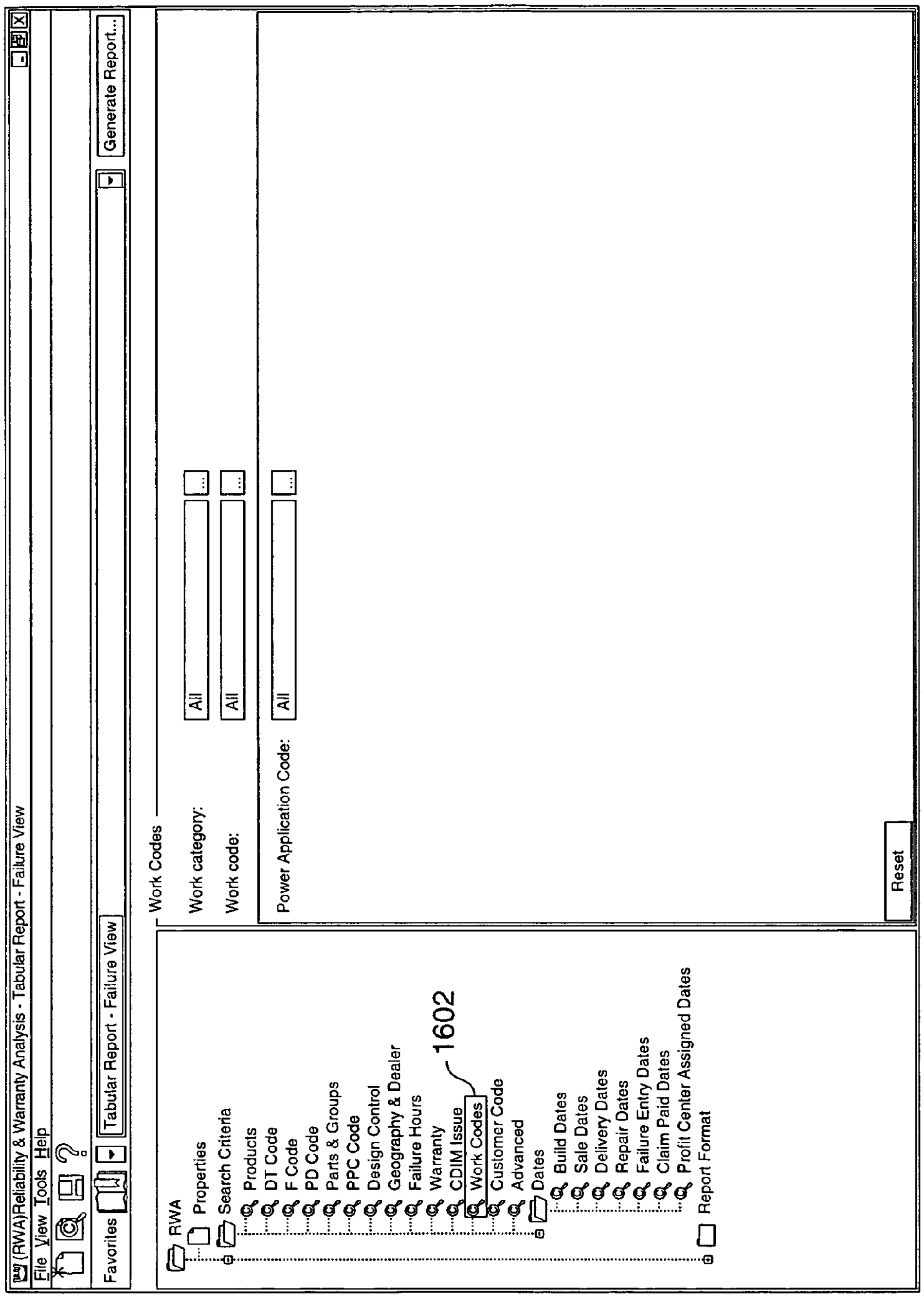
FIGS. 16A, 16B, 16C, and 16D illustrate input screens associated with type of use.
Figure 16B:
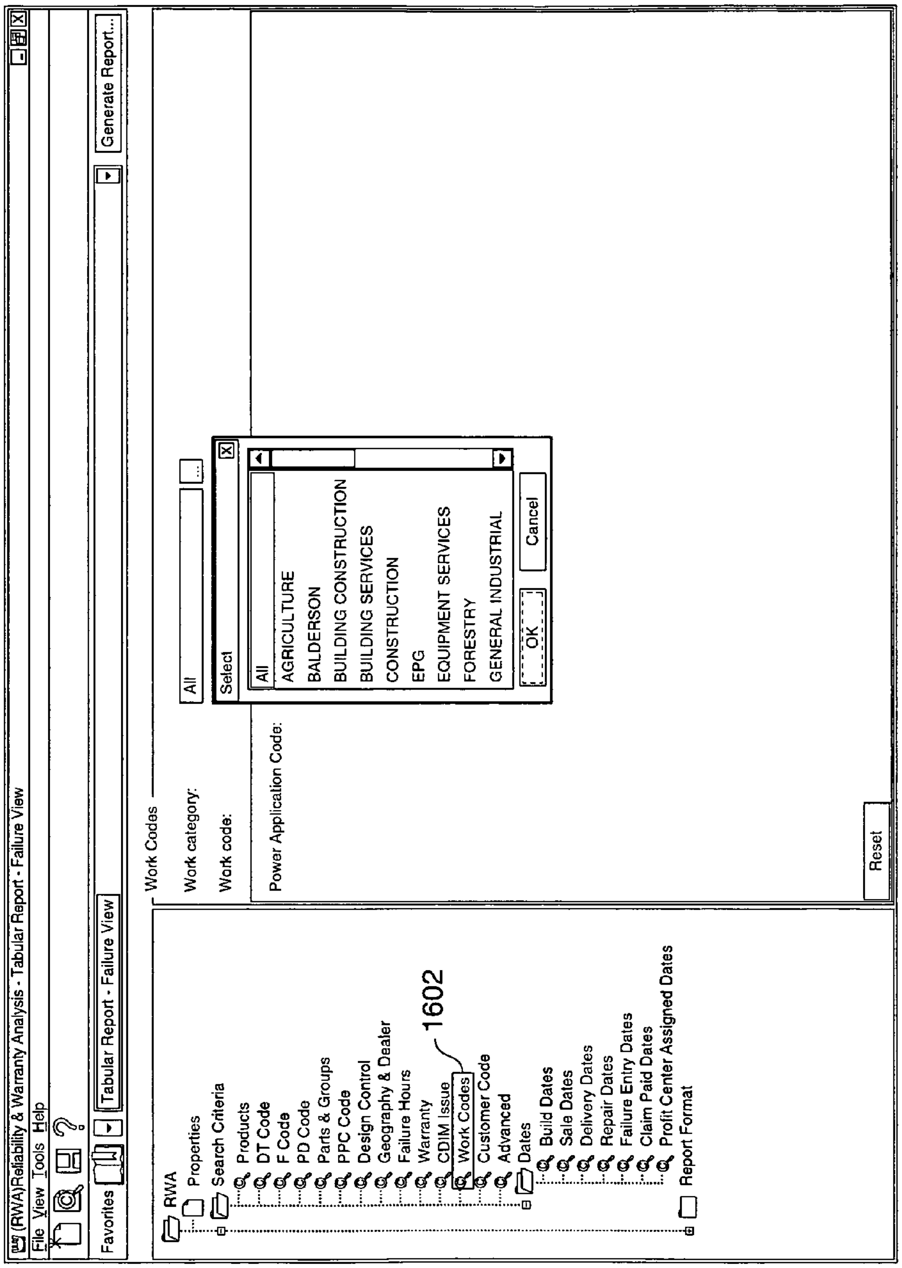
Figure 16C:
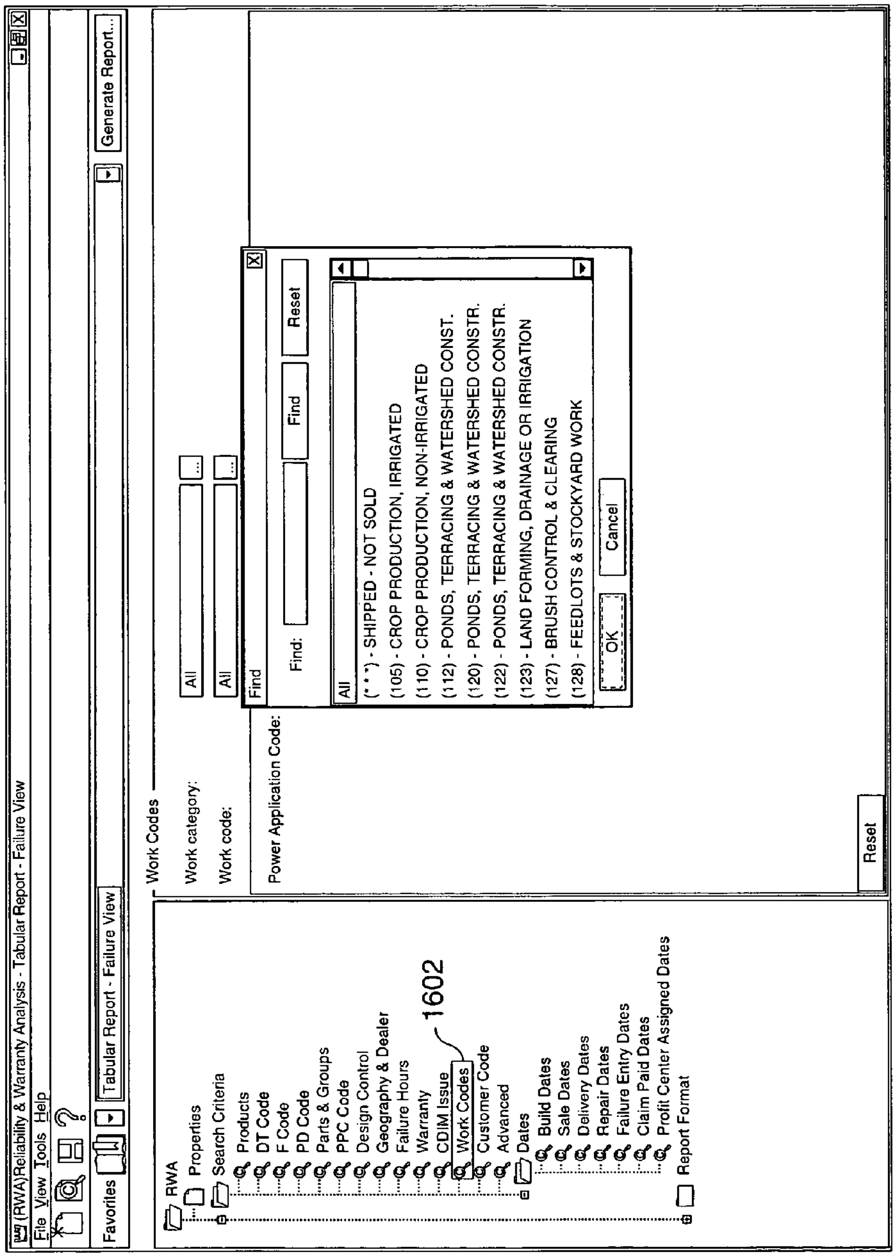
Figure 16D:
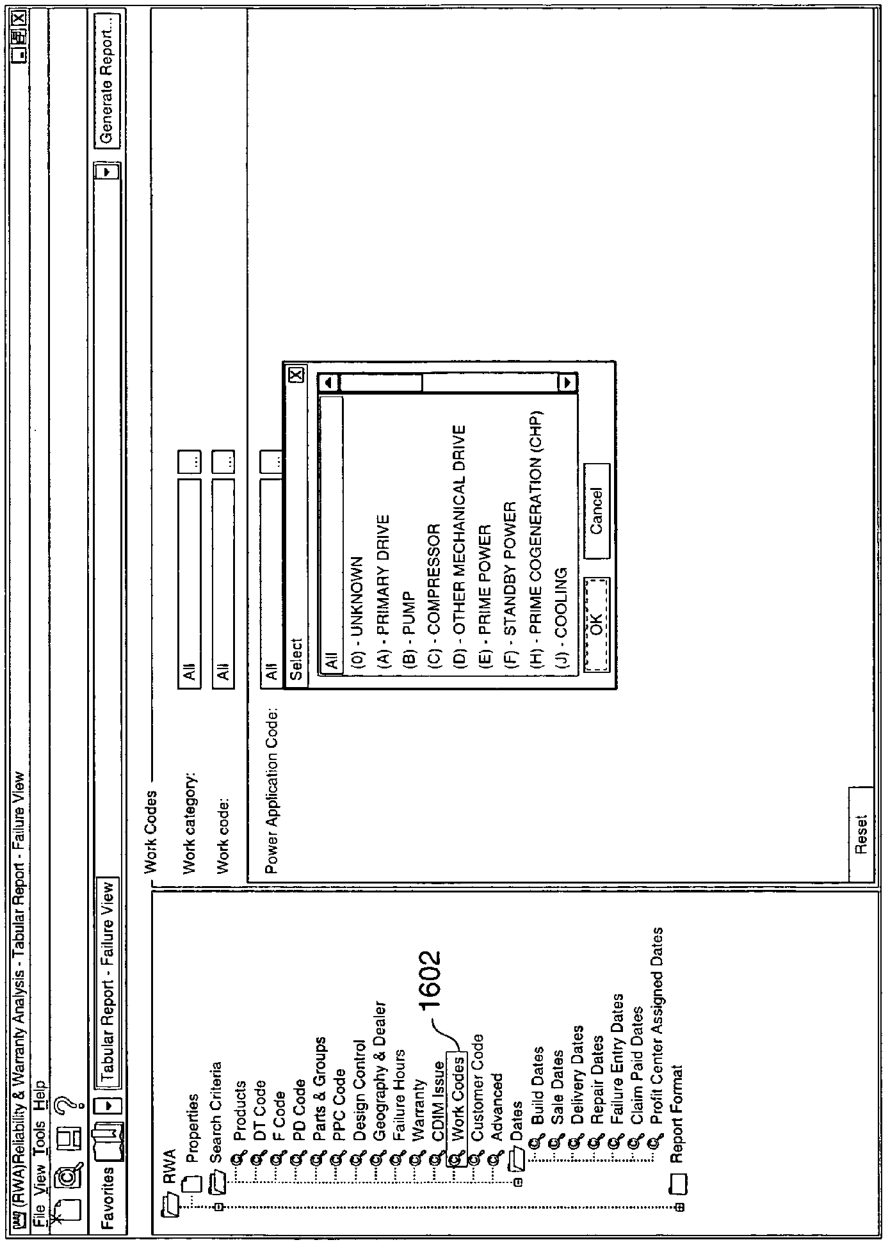

In one embodiment, as illustrated in FIG. 14, the profit center, or department, or group responsible for the part type that failed may be used as the search criteria. This type of search criteria may be useful for the purposes internal to a company. For example, some companies may charge warranty claims against the department, responsible for the part type. Therefore, the search criteria enables a department to understand all of the reliability characteristics, such as how much of the failures are associated with the part types they are responsible for, associated with their group.

In one embodiment, as illustrated in FIGS. 15A-E, the search criteria may be based upon CDIM issues, such as general risk and issues associated with a part.

In one embodiment, search criteria may be based on the type of use, or work the machine is involved in, as illustrated in FIGS. 16A-D. The criteria may include work categories, work codes, and/or application codes.

Figure 17:
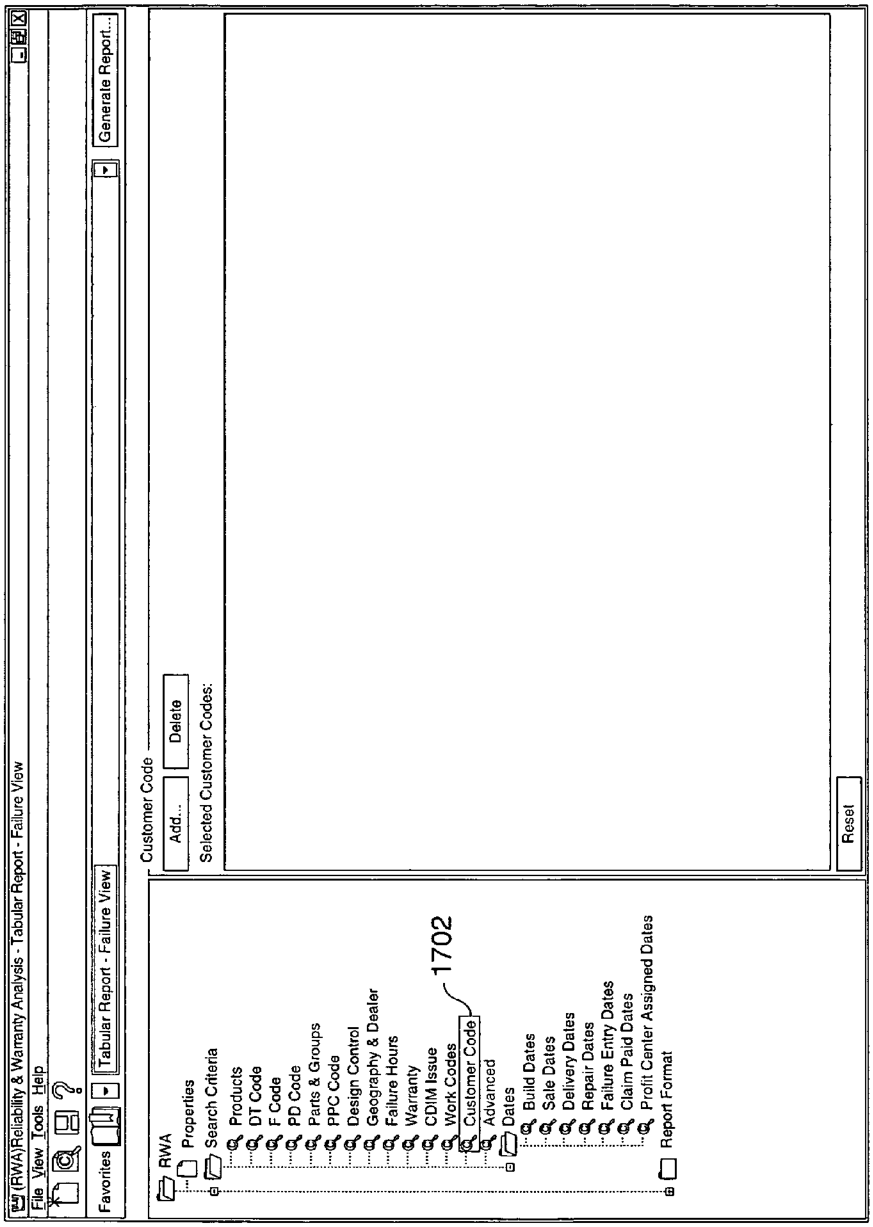
FIG. 17 illustrates an input screen associated with customer codes.

In one embodiment, as illustrated in FIG. 17, the criteria may include a customer code, or associated information, such that the reliability characteristics associated with a particular customer may be searched.

Figure 18:
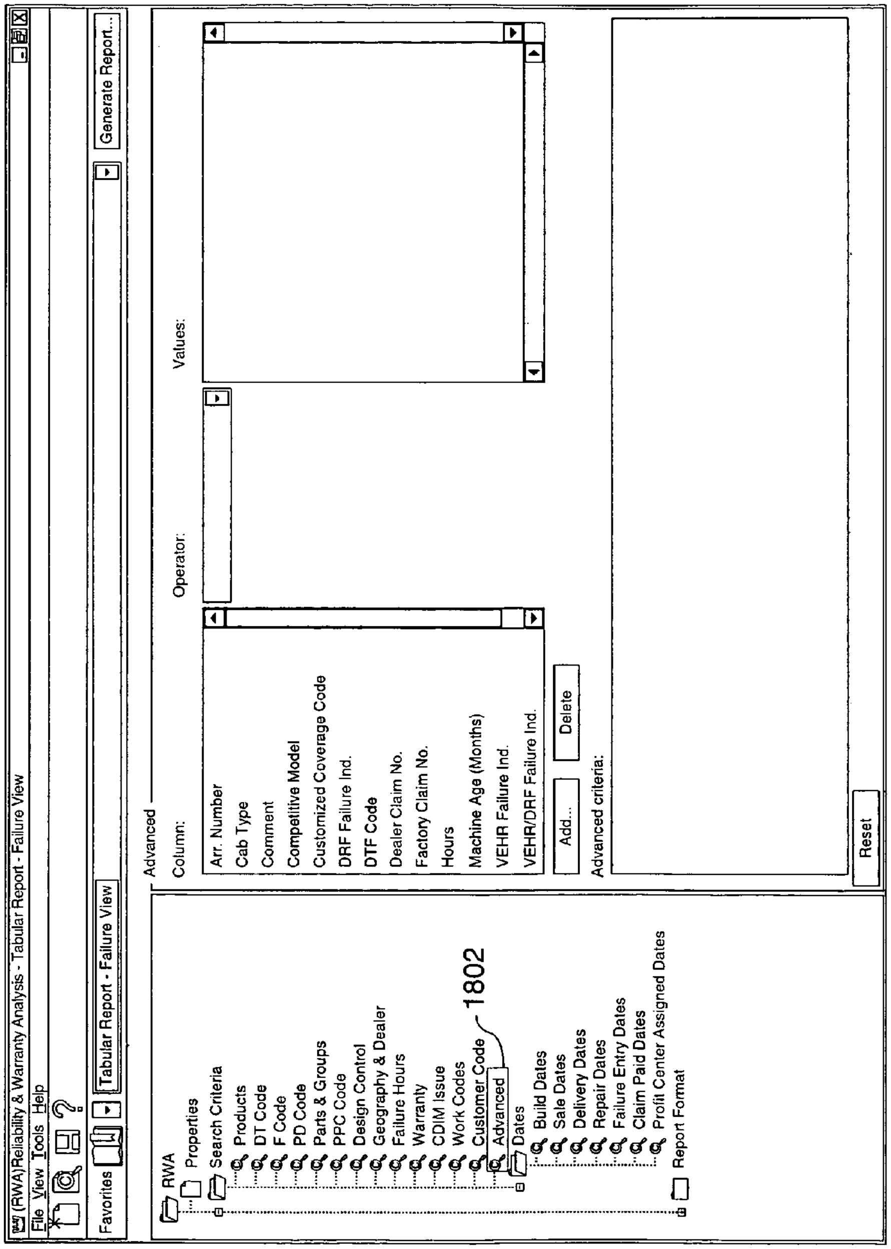
FIG. 18 illustrates an input screen associated with advanced search capability.

In one embodiment, as illustrated in FIG. 18, an advanced search criteria may be established based on various additional selections, enabling the user to further configure their search.

In one embodiment, the search criteria may be scoped by selecting dates that events of interest occurred. For example, a date criteria may be established by selecting a date criteria folder 450, and then selecting the event based date of interest. For example, the events, or event ranges may include dates the part types were built 436, sale dates of the part types 438, delivery dates 440, repair dates 442, dates the failures were logged 444, dates claims were paid 446, and the dates the failures were assigned to a profit center, or department 448.

Figure 19A:
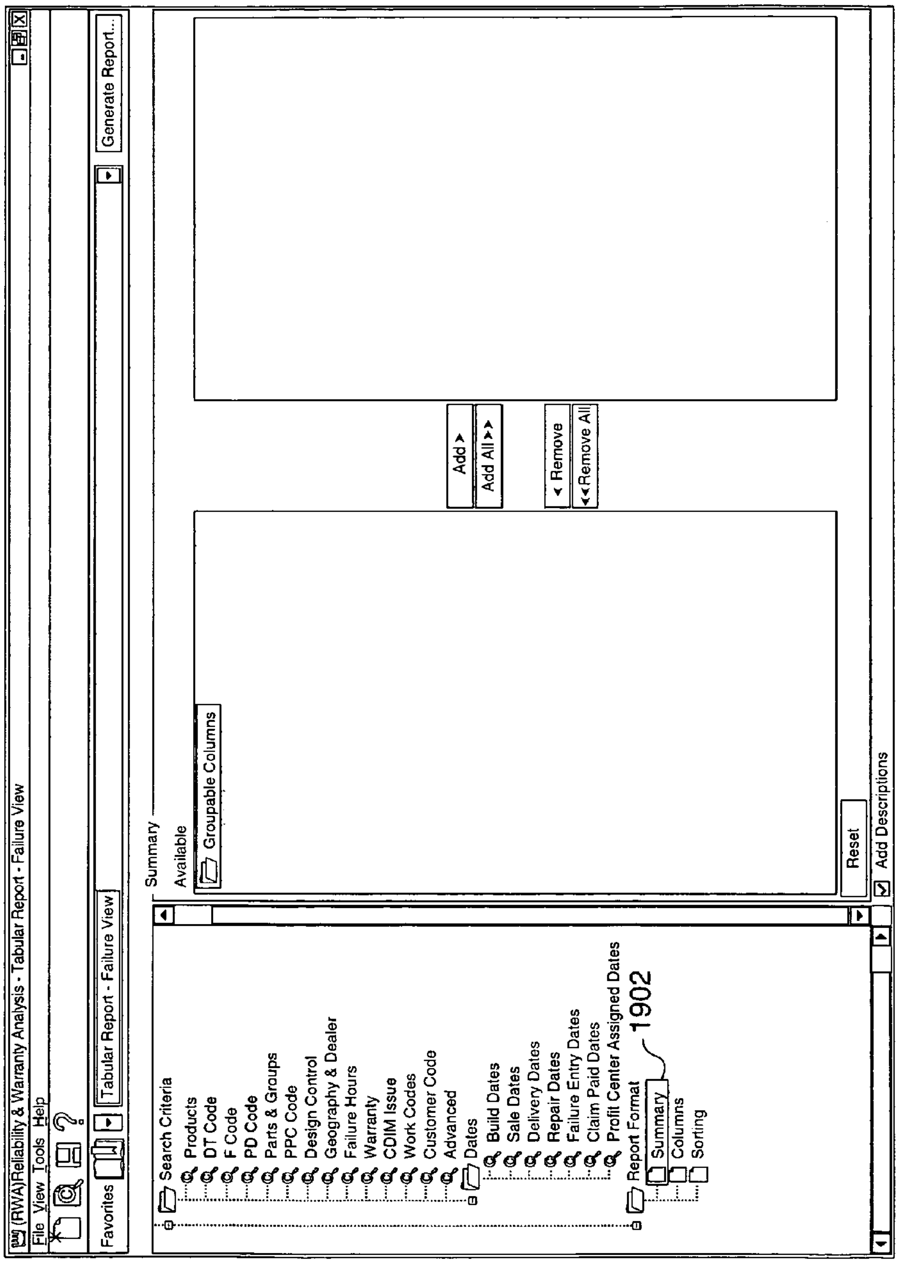
FIGS. 19A, 19B, and 19C illustrate input screens associated with report formats.
Figure 19B:
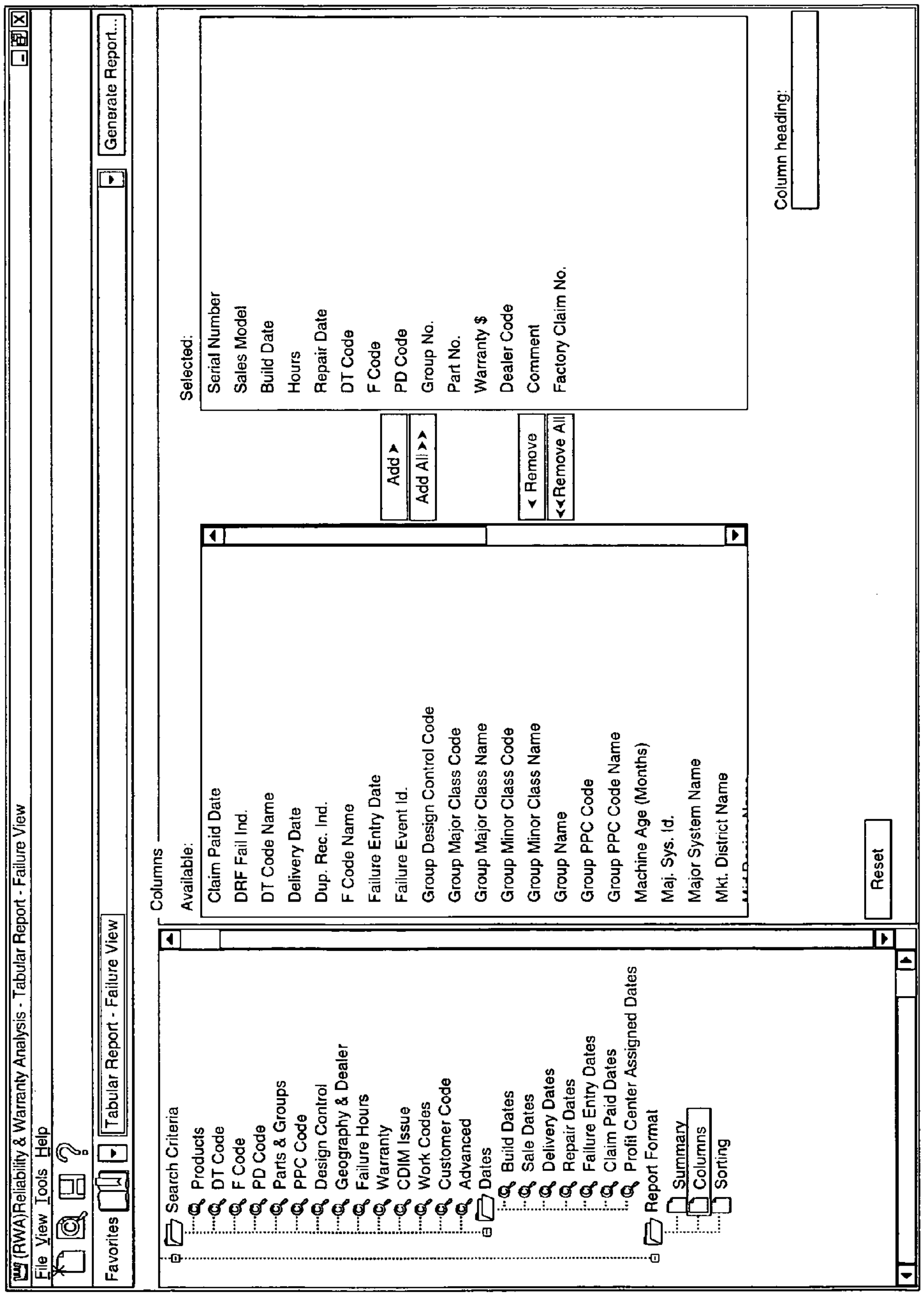
Figure 19C:
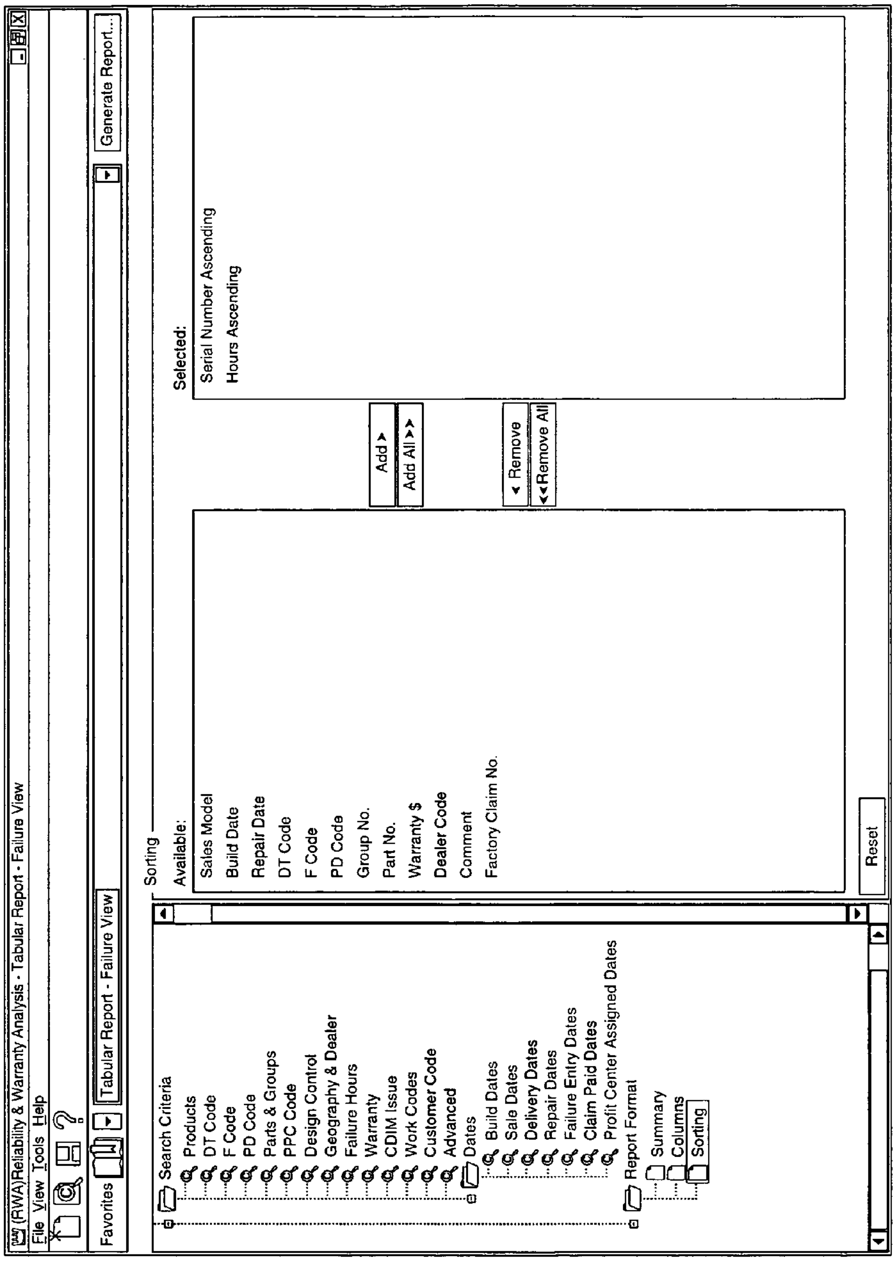
Figure 20:
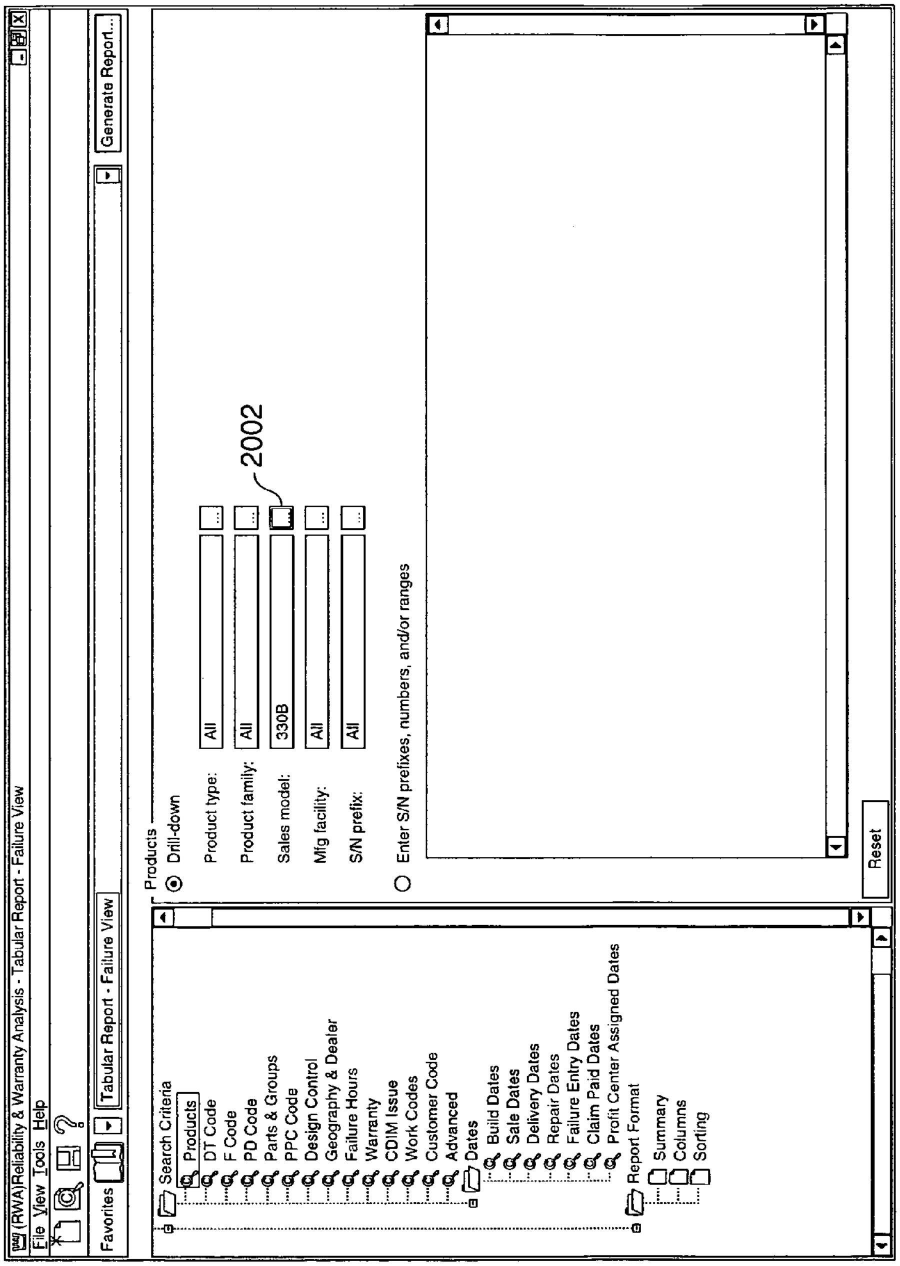
FIG. 20 illustrates an input screen associated with a search criteria.

In one embodiment, as illustrated in FIGS. 19A-C, the format of the reports may be specified. These formats will enable the desired information to be summarized and sorted differently than the default method, and to include/exclude data attributes other than the defaults.

Figure 21:
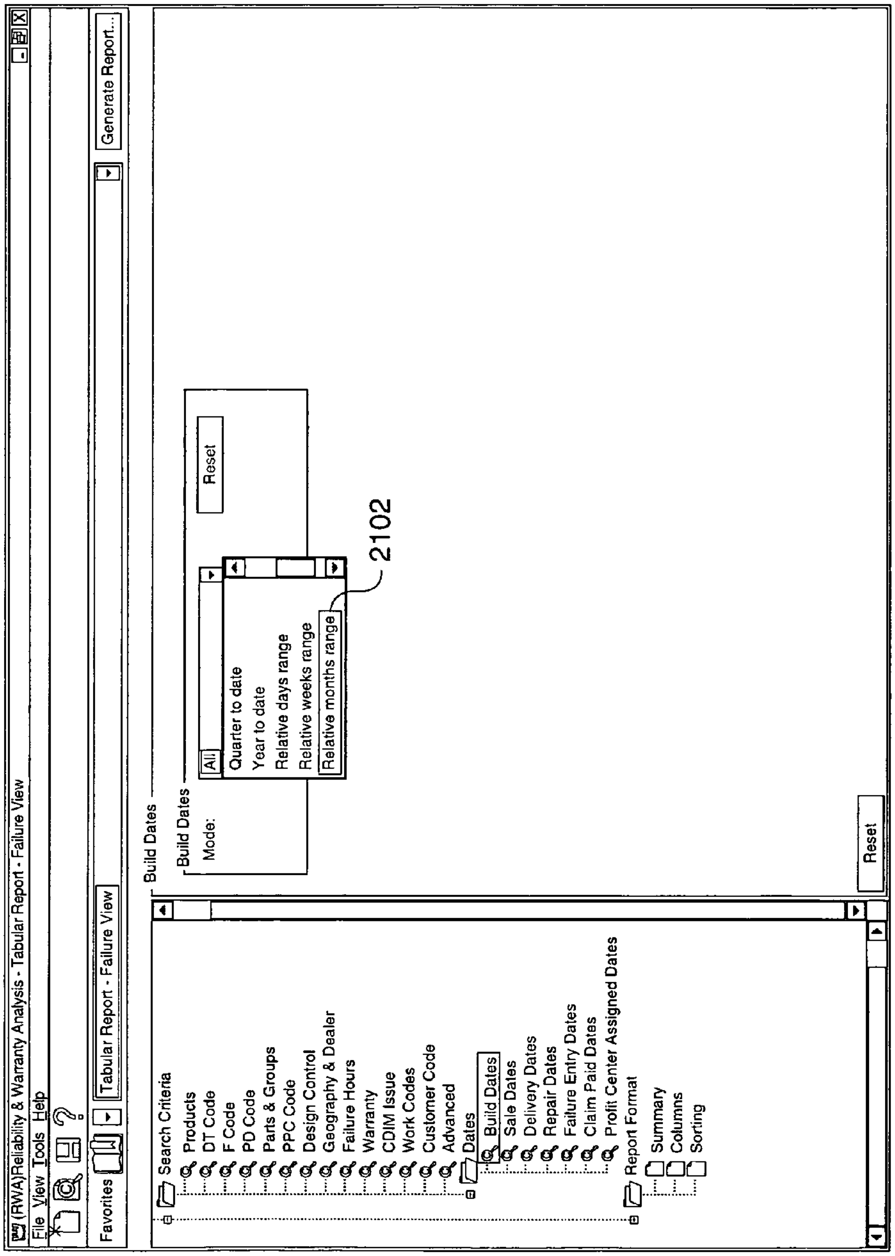
FIG. 21 illustrates an input screen associated with time period selection.
Figure 22:
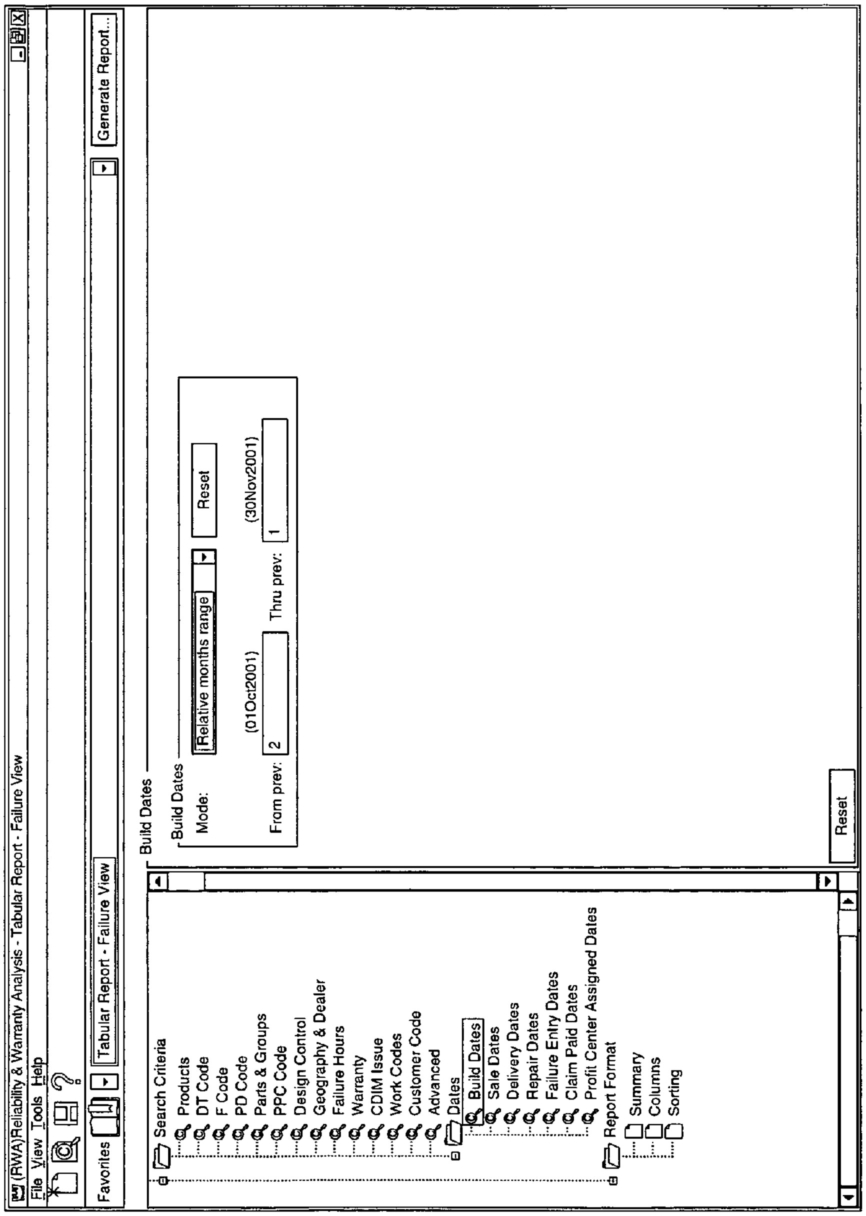
FIG. 22 illustrates an input screen associated with time period selection.
Figure 23:
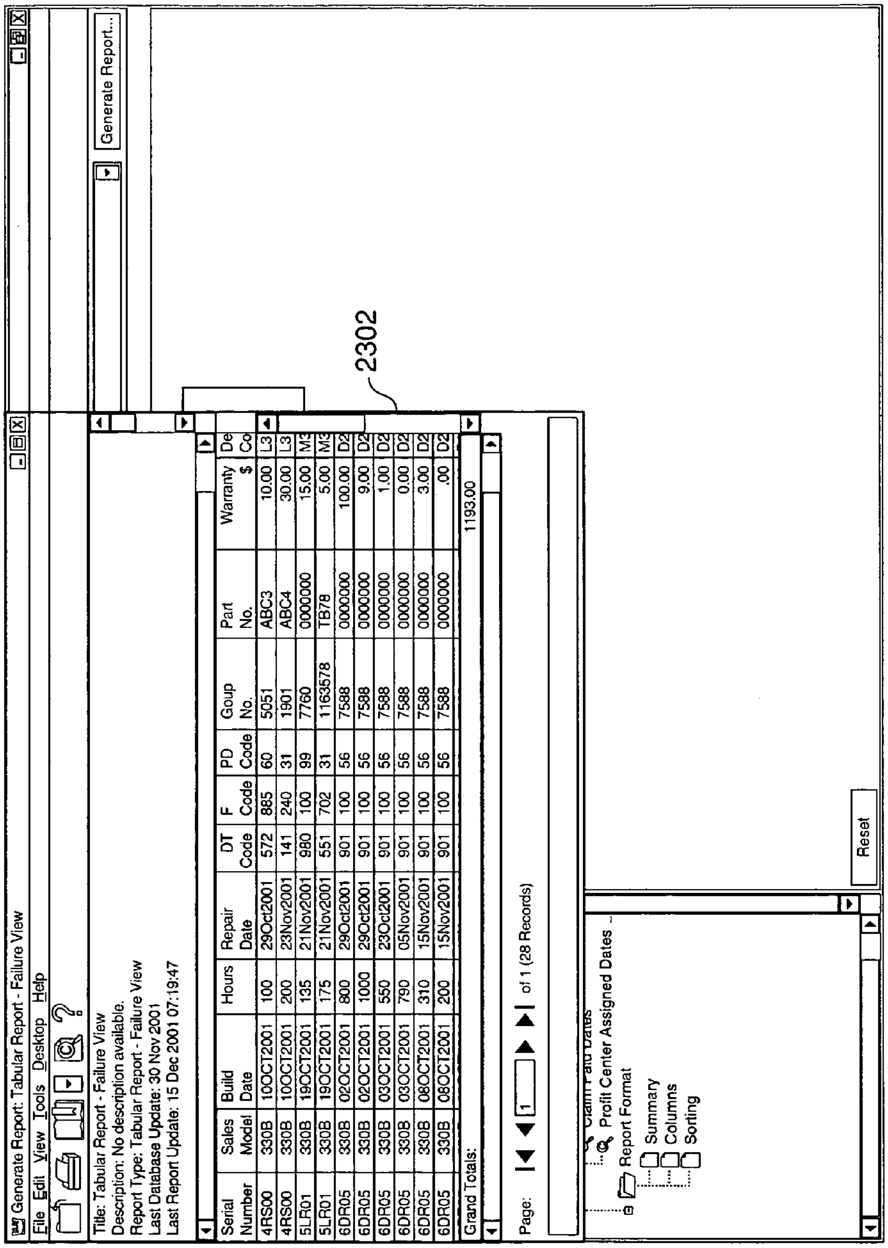
FIG. 23 illustrates an input screen associated with a search report.
Figure 24:
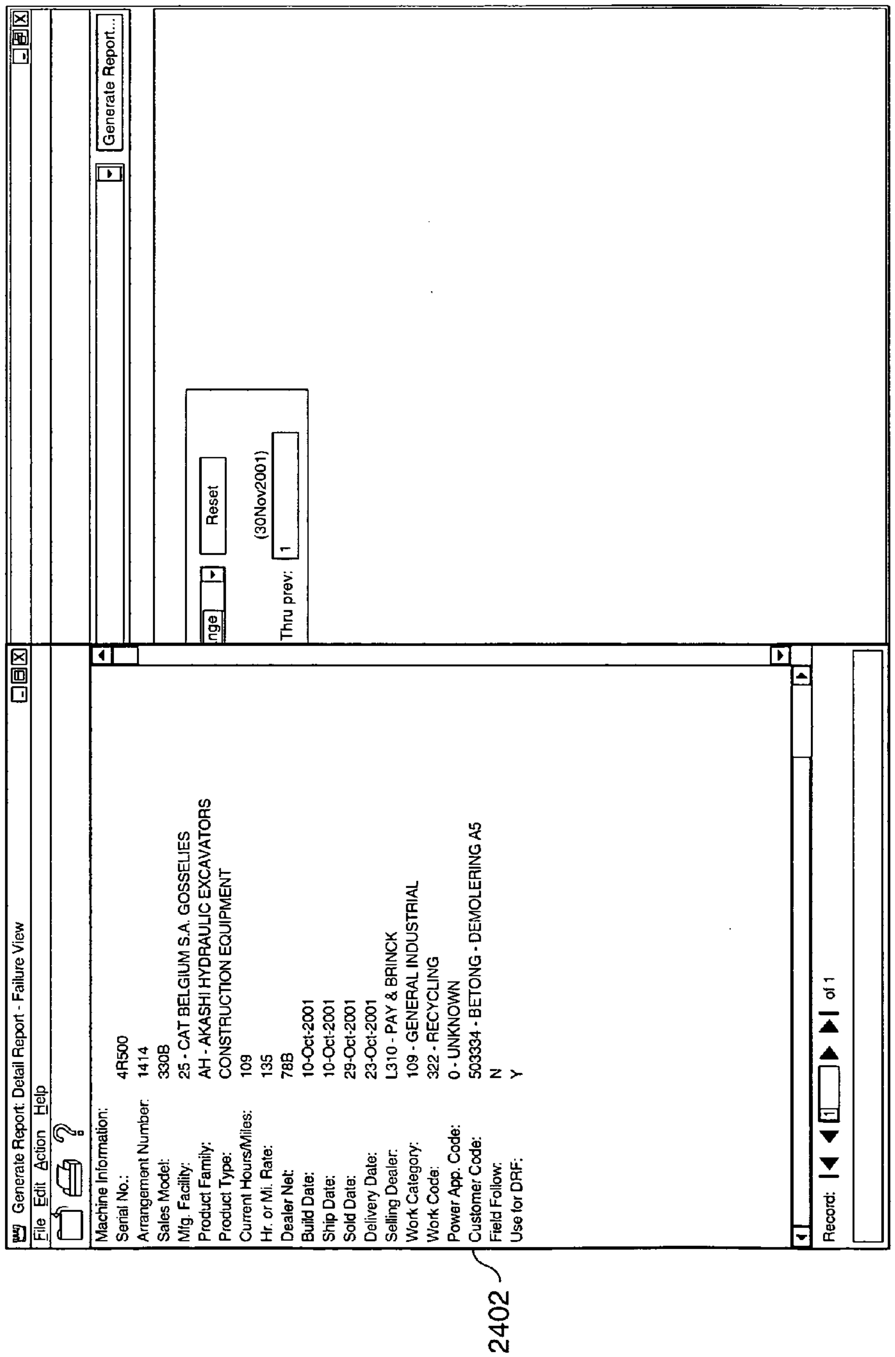
FIG. 24 illustrates an input screen associated with data entry.

FIGS. 20-26 illustrate one example of the use of the system 312 for establishing a reliability of a part type. A search criteria is established associated with a part type model number 330B (FIG. 20), that will include any part failures associated with this part type, that occurred on parts built during a specified time range (Oct. 1, 2001-Nov. 30, 2001, as illustrated in FIGS. 21 and 22 respectively). A search report, illustrated in FIG. 23, indicates that there are 28 incidents of the specified part type (330B) that failed during the designated time period. The report indicates the serial number of the part associated with the failure. Upon activating the serial number (e.g., clicking on it with a mouse), additional details associated with the part may be established, as illustrated in FIG. 24. In addition, the failure codes are listed in the report illustrated in FIG. 23.

Figure 25:
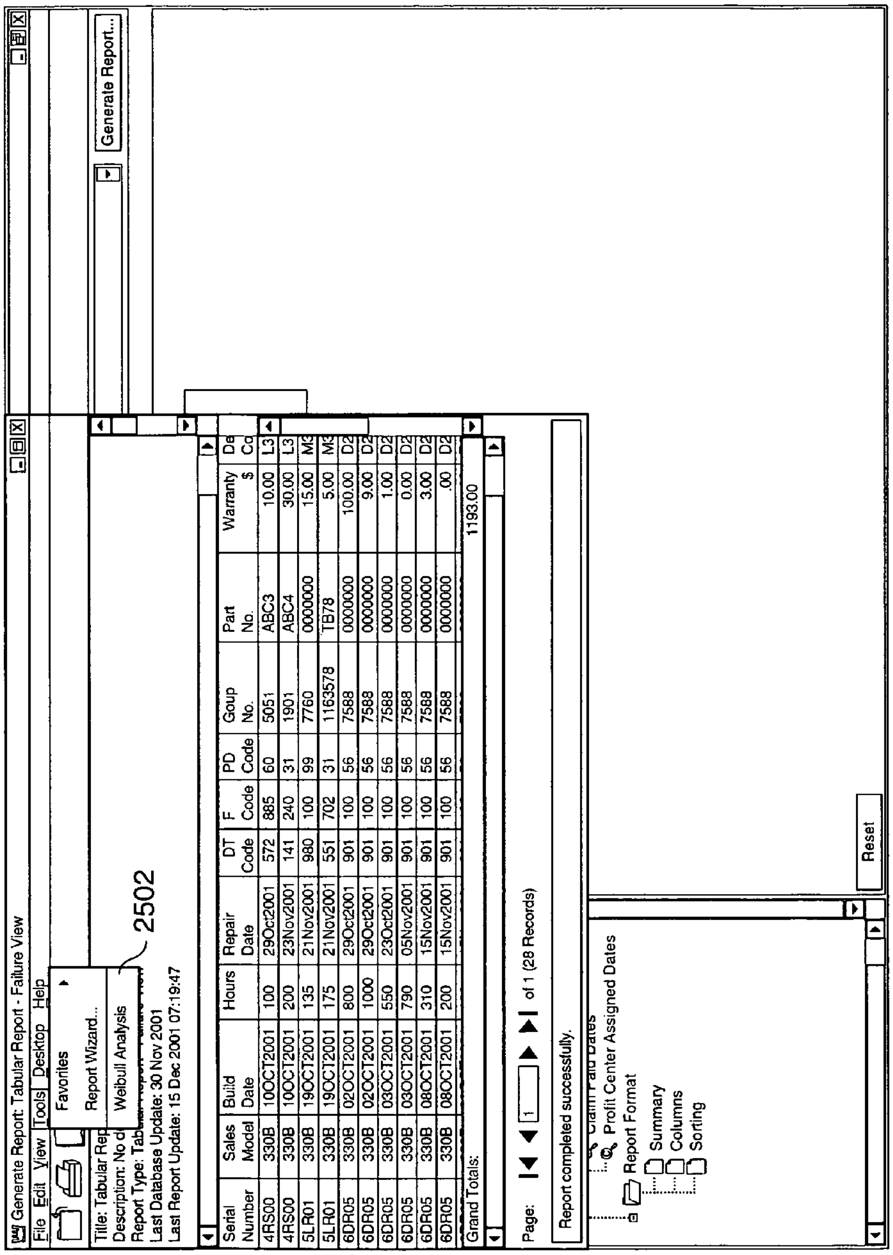
FIG. 25 illustrates an input screen associated with Weibull analysis.
Figure 26:
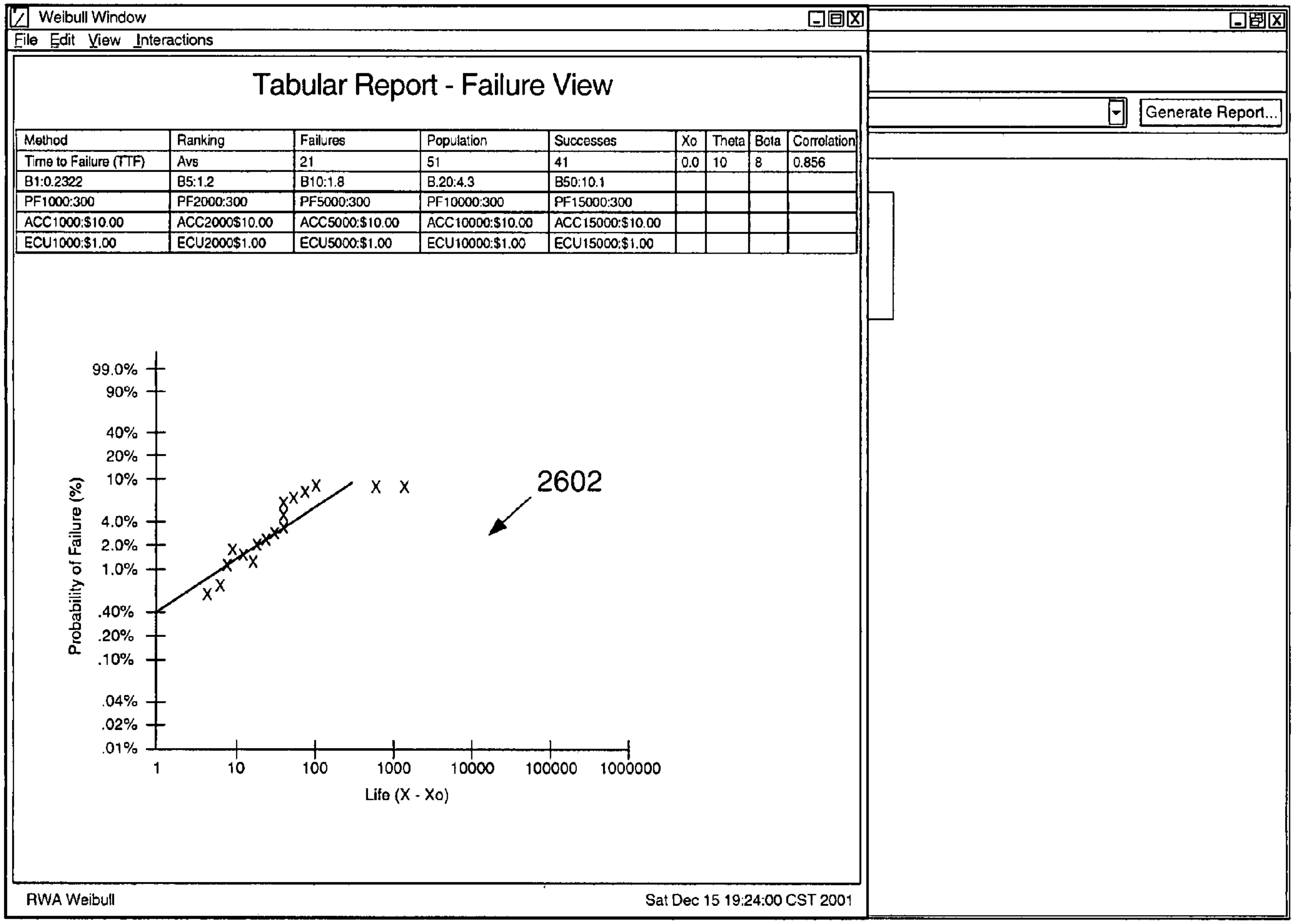
FIG. 26 illustrates an input screen associated with a graphical illustration of a reliability characteristic.

In one embodiment, the desired analysis may be performed on the selected data. For example, as illustrated in FIG. 25, a Weibull analysis may be performed on data. The Weibull analysis may be used to establish a reliability characteristic of the part type based on the data, as illustrated in FIG. 26. The reliability characteristic may be the probability of failure of the part type over the life of the part.

In one embodiment, the system may include interactive graphics. For example, when data is graphed, as illustrated in FIG. 26, one of the data points may be highlighted, e.g., by clicking on the point with the mouse. When the point is highlighted, information associated with the point will be displayed on the screen. The information may include, a part identifier (e.g., a serial number), the claim or report number associated with the failure, or other information associated with the reliability of the part, including service characteristics, characteristics of the part owner, usage of the part, type of the use of the part etc. In one embodiment, the information associated with the data point may be pasted onto the display, for future reference, and/or quick illustration of the information. In one embodiment, a highlighted data point may be removed from the analysis. For example, if a data point does not seem appropriate (e.g., data entry may have created an error), or if it is desired to see what effect the elimination of a data point would have, the point may be highlighted, and then removed. In one embodiment, the removal may occur as a menu option where once the point is highlighted, a menu option associated with removing the data point is selected. The point is then removed and the analysis/report is rerun, and the new results are illustrated to the user. Again, interactive graphics enables the system to perform extremely flexible analysis to establish one or more reliability characteristics of a part.

In one embodiment, automated notification may be initiated in response to the reliability characteristic. Information associated with the part type may be updated in an automated manner. For example, service related information may be received and used to update reliability characteristics associated with a part type. In one embodiment, each time service information is received related to a part type, the reliability characteristics of the part type may be updated. Alternatively the update may occur at established intervals, e.g., once a day, once a week, after a certain number of service reports are received (e.g., every fifth report), etc. There may be one or more watches on a particular part type. A watch may be a monitoring function established to determine if an aspect of a reliability characteristic associated with the part, or part type exceeds a threshold, then an action may be taken. Actions taken may range from the setting of a flag to updating a report, to automated notification to a user. If one or more of the reliability characteristics being monitored exceeds a threshold, e.g., a value exceeds a threshold, a trend exceeds a threshold, then a user may be notified in an automated manner. User notification may occur via an e-mail, fax, or other form of electronic communication, or it may occur by notifying the user (either textually or visually, e.g., with a graph). In one embodiment, when a user accesses the computer system, the user is prompted with a notification that a threshold has been exceeded, and prompted to review the information. If the user elects to review the information, the computer system may display graphs, reports and/or data associated with the part type, the reliability characteristic being monitored, and/or the threshold that was exceeded. As mentioned, examples of monitoring reliability characteristics include: the user may be notified when a certain failure has occurred for a part type (e.g., first failure, twentieth failure etc.), or when a repair frequency exceeds or drops below a designated threshold, or when the rate of change or a probability of failure exceeds a threshold rate of change.

INDUSTRIAL APPLICABILITY

The present invention includes a method and system configured to establish a reliability characteristic associated with a part type. The method includes the step of establishing a use associated with a part, the part being of the part type, establishing an amount of usage associated with the part, establishing a service characteristic associated with said part, and establishing the reliability characteristic associated with the part type in response to said part use the part usage, and the part service characteristic. In one embodiment, the computer system is provided that will enable a user to collect reliability related information associated with the part and/or part type, and then analyze the information in multiple ways, thereby providing a flexible analysis tool for establishing one or more reliability characteristics associated with the part and/or part type. In one embodiment, the computer system is web enabled thereby enabling access to the reliability information to appropriate people throughout the company, and even to suppliers and/or customers when appropriate.

In addition, the tool may be used to make design and production decisions regarding a particular part type. For example, based on reliability characteristics determined during the prototype stages, and probability of success and/or probability of failure analysis, should the part type be put into production. In addition, the reliability characteristics may include determining which part types are the leading failure parts, e.g., determined based on characteristics such as the number of failures, cost of the failures, probability of failures/success, repair frequencies etc. In this manner a company can direct its attention to fixing the part types creating the most concern for the company.

Other aspects, object, and advantages of the present invention can be obtained from a study of the drawings, the disclosure, and the claims.

What is claimed is:

1. A computer implemented method of establishing a reliability characteristic associated with a part type, comprising the steps of:

establishing, using a computer, a use associated with a part, said part being of said part type;

establishing, using the computer, an amount of usage associated with said part including determining an estimated amount of said part usage, wherein determining the estimated amount of said part usage includes the steps of:

determining the user of the part, and determining said estimated part usage in response to said part user;

establishing, using the computer, a service characteristic associated with said part;

receiving one or more search criteria from a user;

establishing, using the computer, said reliability characteristic associated with said part type in response to said search criteria, said part use, said part usage, and said part service characteristic; and outputting said reliability characteristic on a computer display device.

2. The method as set forth in claim 1, wherein the step of establishing said amount of part usage further comprises the step of determining an actual amount of said part usage.

3. The method as set forth in claim 1, wherein the step of determining an estimated amount of said part usage includes determining said estimated amount in response to a previous actual usage of the part.

4. The method as set forth in claim 1, wherein the step of determining said part usage in response to said part user further includes the step of determining said part usage in response to said part user and said part use.

5. The method as set forth in claim 1, further including the step of predicting a reliability characteristics of said part in response to said part usage.

6. The method as set forth in claim 1, wherein said reliability characteristic includes at least one of a repair frequency associated with said part type, and a life expectancy of said part type.

7. A computer system configured to establish a reliability characteristic associated with a part type, comprising:

a repository configured to store information associated with said part type, said information including: a use of a part, said part being of said part type, an estimated amount of usage of said part, the estimated amount of usage determined in response to determining a user of the part and a service characteristic of said part; and a controller configured to establish the reliability characteristic associated with the part type in response to said part use, said estimated part usage, and said part service characteristic.

8. The computer system as set forth in claim 7, wherein said system is further configured to include a user interface.

9. The computer system as set forth in claim 8, wherein the user interface is configured to allow a user to search the repository.

10. The computer system as set forth in claim 9, wherein the user interface is configured to display information associated with a part type during a specified time range.

11. The computer system as set forth in claim 7, further comprising an electronic interface configured to receive information associated with at least one of a type of part usage, said estimated amount of part usage, a part warranty, a part failure, and said service characteristic of said part.

12. The computer system as set forth in claim 11, wherein said repository is automatically updated in response to said received information.

13. The computer system as set forth in claim 12, wherein said controller is further configured to automatically notify a user in response to said received information.

14. The computer system as set forth in claim 7, wherein the part service characteristic includes a warranty claim.

15. The computer system as set forth in claim 7, wherein the part service characteristic includes a service report.

16. The computer system as set forth in claim 15, wherein the service report includes information relating to preventative maintenance associated with the part.

17. The computer system as set forth in claim 15, wherein the service report includes information associated with a part failure.

18. The computer system as set forth in claim 7, wherein the part service characteristic is associated with a part type.

19. The computer system as set forth in claim 7, wherein the repository is further configured to store data relating to repair frequency associated with a part type.

20. The computer system as set forth in claim 7, wherein the repository is further configured to store data relating to at least one of: sale price of a machine, purchaser of a machine, intended use of a machine, location where a machine will be used.

* * * * *